US011366514B2

(12) United States Patent
Burns

(10) Patent No.: US 11,366,514 B2
(45) Date of Patent: Jun. 21, 2022

(54) APPLICATION PLACEMENT BASED ON HEAD POSITION

(71) Applicant: Apple Inc., Cupertino, CA (US)

(72) Inventor: Aaron M. Burns, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/552,549

(22) Filed: Aug. 27, 2019

(65) Prior Publication Data

US 2020/0103962 A1 Apr. 2, 2020

Related U.S. Application Data

(60) Provisional application No. 62/738,927, filed on Sep. 28, 2018.

(51) Int. Cl.
G06F 3/01 (2006.01)
G06T 3/20 (2006.01)

(52) U.S. Cl.
CPC ............. *G06F 3/012* (2013.01); *G06T 3/20* (2013.01); *G06T 2200/24* (2013.01)

(58) Field of Classification Search
None
See application file for complete search history.

(56) References Cited

U.S. PATENT DOCUMENTS

| | | | |
|---|---|---|---|
| 9,411,412 B1* | 8/2016 | Jain | G06F 3/012 |
| 9,459,692 B1* | 10/2016 | Li | G06T 7/248 |
| 9,665,249 B1* | 5/2017 | Ding | G06F 3/013 |
| 10,403,043 B2 | 9/2019 | Kaufman et al. | |
| 2001/0044858 A1 | 11/2001 | Rekimoto | |
| 2012/0124509 A1 | 5/2012 | Matsuda et al. | |
| 2012/0249741 A1 | 10/2012 | Maciocci et al. | |
| 2013/0007672 A1 | 1/2013 | Taubman | |
| 2014/0225919 A1 | 8/2014 | Kaino et al. | |
| 2014/0282220 A1 | 9/2014 | Wantland et al. | |
| 2014/0375680 A1 | 12/2014 | Ackerman et al. | |
| 2015/0009132 A1* | 1/2015 | Kuriya | G06F 3/012 345/156 |
| 2015/0215351 A1 | 7/2015 | Barzuza et al. | |
| 2015/0235267 A1 | 8/2015 | Steube et al. | |
| 2015/0302867 A1 | 10/2015 | Tomlin et al. | |

(Continued)

FOREIGN PATENT DOCUMENTS

| | | |
|---|---|---|
| CN | 103765366 A | 4/2014 |
| CN | 104115100 A | 10/2014 |

(Continued)

OTHER PUBLICATIONS

Zinchenko et al., "Virtual Reality Control of a Robotic Camera Holder for Minimally Invasive Surgery", (Year: 2017).*

(Continued)

*Primary Examiner* — Hilina K Demeter
(74) *Attorney, Agent, or Firm* — Dentons US LLP

(57) ABSTRACT

The present disclosure relates to determining when the head position of a user viewing user interfaces in a computer-generated reality environment is not in a comfortable and/or ergonomic position and repositioning the displayed user interface so that the user will reposition her/his head to view the user interface at a more comfortable and/or ergonomic head position.

27 Claims, 17 Drawing Sheets

(56) References Cited

U.S. PATENT DOCUMENTS

| | | | |
|---|---|---|---|
| 2016/0026242 A1* | 1/2016 | Burns | G06F 3/012 |
| | | | 345/633 |
| 2016/0027216 A1 | 1/2016 | Da Veiga et al. | |
| 2016/0148433 A1* | 5/2016 | Petrovskaya | G06T 19/006 |
| | | | 345/633 |
| 2016/0217614 A1* | 7/2016 | Kraver | G02B 27/017 |
| 2017/0061696 A1* | 3/2017 | Li | G02B 27/017 |
| 2017/0092235 A1* | 3/2017 | Osman | G06F 3/16 |
| 2017/0123489 A1 | 5/2017 | Guenter | |
| 2017/0123491 A1 | 5/2017 | Hansen et al. | |
| 2017/0185148 A1* | 6/2017 | Kondo | G06F 3/013 |
| 2017/0203213 A1* | 7/2017 | Stafford | A63F 13/25 |
| 2017/0232335 A1 | 8/2017 | Williams et al. | |
| 2017/0256096 A1 | 9/2017 | Faaborg et al. | |
| 2017/0263056 A1* | 9/2017 | Leppanen | G06T 19/006 |
| 2017/0344127 A1 | 11/2017 | Hu et al. | |
| 2018/0095607 A1 | 4/2018 | Proctor | |
| 2018/0286126 A1 | 10/2018 | Schwarz et al. | |
| 2018/0350119 A1* | 12/2018 | Kocharlakota | G06F 3/013 |
| 2019/0227763 A1 | 7/2019 | Kaufthal | |
| 2019/0272138 A1* | 9/2019 | Krauss | G06T 19/006 |
| 2020/0020162 A1* | 1/2020 | Jones | G01C 21/20 |
| 2020/0089313 A1* | 3/2020 | Himane | G06T 7/74 |
| 2020/0293177 A1 | 9/2020 | Iglesias | |

FOREIGN PATENT DOCUMENTS

| | | |
|---|---|---|
| CN | 105431763 A | 3/2016 |
| CN | 106716302 A | 5/2017 |
| CN | 108136258 A | 6/2018 |
| EP | 3039555 A1 | 7/2016 |
| WO | 2015/140106 A1 | 9/2015 |
| WO | 2016/014872 A1 | 1/2016 |
| WO | 2016/073986 A1 | 5/2016 |
| WO | 2017/171943 A1 | 10/2017 |

OTHER PUBLICATIONS

International Preliminary Report on Patentability received for PCT Patent Application No. PCT/US2018/052748, dated Apr. 9, 2020, 11 pages.

International Search Report and Written Opinion Received for PCT Application No. PCT/US2018/052748, dated Dec. 14, 2018, 12 pages.

Fitzmaurice et al., "Bricks: Laying the Foundations for Graspable User Interfaces", May 7-11, 1995, pp. 442-449.

Regenbrecht et al., "A tangible AR desktop environment", Computers & Graphics, vol. 25, No. 5, Oct. 2001, pp. 755-763.

Shaer et al., "Tangible User Interfaces: Past, Present, and Future Directions", Foundations and Trends? in Human-Computer Interaction, vol. 3, No. 1-2, 2009, pp. 1-137.

The Dynamic Desktop (in the office of the future . . . )—YouTube, Online Available at: https://www.youtube.com/watch?v=m9IZfnRrM4Y, Aug. 20, 2014, 1 page.

Corrected Notice of Allowance received for U.S. Appl. No. 16/651,249, dated Feb. 18, 2021, 2 pages.

Notice of Allowance received for U.S. Appl. No. 16/651,249, dated Jan. 27, 2021, 11 pages.

Piekarski et al., "Integrating Virtual and Augmented Realities in an Outdoor Application", IEEE, Feb. 1999, 10 pages.

Dedual et al., "Creating Hybrid User Interfaces with a 2D Multi-touch Tabletop and a 3D See-Through Head-Worn Display", IEEE International Symposium on Mixed and Augmented Reality, Science and Technology Proceedings, Oct. 26-29, 2011, 2 pages.

International Search Report and Written Opinion received for PCT Patent Application No. PCT/US2020/048845, dated Feb. 1, 2021, 20 pages.

International Search Report and Written Opinion received for PCT Patent Application No. PCT/US2020/052886, dated Feb. 1, 2021, 22 pages.

Invitation to Pay Additional Fees received for PCT Patent Application No. PCT/US2020/048845, dated Dec. 4, 2020, 13 pages.

Invitation to Pay Additional Fees received for PCT Patent Application No. PCT/US2020/052886, dated Dec. 9, 2020, 15 pages.

Office Action received for Chinese Patent Application No. 201910868273.0, dated Sep. 24, 2021, 24 pages (12 pages of English Translation).

Notice of Allowance received for Chinese Patent Application No. 201910868273.0, dated Feb. 8, 2022, 4 pages (1 page of English Translation).

\* cited by examiner

APPLICATION PLACEMENT BASED ON HEAD POSITION

CROSS-REFERENCE TO RELATED APPLICATIONS

This application claims priority to U.S. Provisional Patent Application No. 62/738,927, entitled "APPLICATION PLACEMENT BASED ON HEAD POSITION", filed on Sep. 28, 2018, the contents of which are hereby incorporated by reference.

TECHNICAL FIELD

The present disclosure relates generally to computer-generated reality experiences, and more specifically to repositioning computer-generated reality objects to promote ergonomic posture.

BACKGROUND

It is beneficial to improve user comfort and experience during computer-generated reality experiences.

SUMMARY

The present disclosure describes techniques for determining whether the user's head position is in an ergonomic position while the user is viewing user interfaces in a computer-generated reality environment and repositioning the computer-generated reality content so that the user can view the computer-generated reality content from a more comfortable and/or ergonomic head position.

In some embodiments, a method is described. The method comprising: displaying a user interface at a first position in a computer-generated reality environment; obtaining a first head position, wherein the first head position is obtained using one or more sensors; and in accordance with a determination that the first head position is located outside a range of positions: displaying the user interface at a second position in the computer-generated reality environment, wherein the second position corresponds to a second head position within the range of positions.

In some embodiments, the user interface is displayed at the second position in the computer-generated reality environment based on the detected first head position. In some embodiments, the displayed user interface at the second position is viewable from the second head position, but is not viewable or is only partially viewable from the first head position. The second head position permits a line of sight to the user interface displayed at the second position within a predetermined number of degrees from a forward vector.

The method further includes displaying a notification if the first head position is outside the range of positions. In some embodiments, the first head position that is outside the range of positions is located within a warning range of positions. The method includes displaying a notification if the first head position is located outside the warning range of positions or located outside the warning range of positions for a duration longer than a predetermined time period.

In some embodiments, in accordance with a determination that the first head position is located outside the range of positions the user device receives an indication through an application programming interface that the user interface should be moved to a different position. In some embodiments, the one or more sensors used to obtain the head position are located on an external device that is different from the electronic device that is displaying the user interface. In some embodiments, when the first head position is located outside the range of positions, the user interface is no longer displayed at the first position in the computer-generated reality environment. In some embodiments, when the first head position is located outside the range of positions, the computer-generated reality environment is no longer displayed. Gaze and posture may be factors used for determining whether the first head position is located outside the range of positions. In some embodiments, when the first head position is located within the range of positions, the user interface is not moved to a second position.

In some embodiments, the displayed user interface at a first position in the computer-generated reality environment corresponds to a first application and the method further includes: while displaying the user interface of the first application in the first position, receiving a notification from a second application different from the first application; displaying the notification at a third position in the computer-generated reality environment; in response to receiving the notification, obtaining a third head position, wherein the third head position is obtained using one or more sensors and the third head position is different from the first head position; and in accordance with a determination that the third head position is located outside the range of positions: displaying the notification at a fourth position in the computer-generated reality environment, wherein the fourth position corresponds to the third head position being moved to a fourth head position within the range of positions.

In some embodiments, the method of claim 1 further includes: displaying a row of icons at a third position at the top of the user interface while the user interface is in the first position, wherein the third position corresponds to a third head position outside the range of positions; and in accordance with a determination that the third head position is located outside the range of positions, displaying the row of icons at a fourth position in the user interface, wherein the fourth position is lower than the third position in the user interface and the fourth position corresponds to a fourth head position within the range of positions.

In some embodiments, the method of claim 1 further includes: displaying a row of icons at a third position at the bottom of the user interface, wherein the third position corresponds to a third head position outside the range of positions; and in accordance with a determination that the third head position is located outside the range of positions, displaying the row of icons at a fourth position in the user interface, wherein the fourth position is higher than the third position in the user interface and the fourth position corresponds to a fourth head position within the range of positions.

In some embodiments, a non-transitory computer-readable medium is described. The non-transitory computer-readable storage medium comprising one or more programs configured to be executed by one or more processors of an electronic device, the one or more programs including instructions for: displaying a user interface at a first position in a computer-generated reality environment; obtaining a first head position, wherein the first head position is obtained using one or more sensors; and in accordance with a determination that the first head position is located outside a range of positions: displaying the user interface at a second position in the computer-generated reality environment, wherein the second position corresponds to a second head position within the range of positions.

In some embodiments, a transitory computer-readable medium is described. The transitory computer-readable storage medium comprising one or more programs configured to be executed by one or more processors of an electronic device, the one or more programs including instructions for: displaying a user interface at a first position in a computer-generated reality environment; obtaining a first head position, wherein the first head position is obtained using one or more sensors; and in accordance with a determination that the first head position is located outside a range of positions: displaying the user interface at a second position in the computer-generated reality environment, wherein the second position corresponds to a second head position within the range of positions.

In some embodiments, an electronic device is described. The electronic device comprising: memory storing one or more programs configured to be executed by the one or more processors, the one or more programs including instructions for: displaying a user interface at a first position in a computer-generated reality environment; obtaining a first head position, wherein the first head position is obtained using one or more sensors; and in accordance with a determination that the first head position is located outside a range of positions: displaying the user interface at a second position in the computer-generated reality environment, wherein the second position corresponds to a second head position within the range of positions.

In some embodiments, an electronic device is described. The electronic device comprising: means for displaying a user interface at a first position in a computer-generated reality environment; means for obtaining a first head position, wherein the first head position is obtained using one or more sensors; and means for in accordance with a determination that the first head position is located outside a range of positions: means for displaying the user interface at a second position in the computer-generated reality environment, wherein the second position corresponds to a second head position within the range of positions.

BRIEF DESCRIPTION OF THE DRAWINGS

In the following description, reference is made to the accompanying drawings which form a part thereof, and which illustrate several examples of the present disclosure. It is understood that other examples may be utilized and structural and operational changes may be made without departing from the scope of the present disclosure. The use of the same reference symbols in different drawings indicates similar or identical items.

DETAILED DESCRIPTION

Figure 1A:
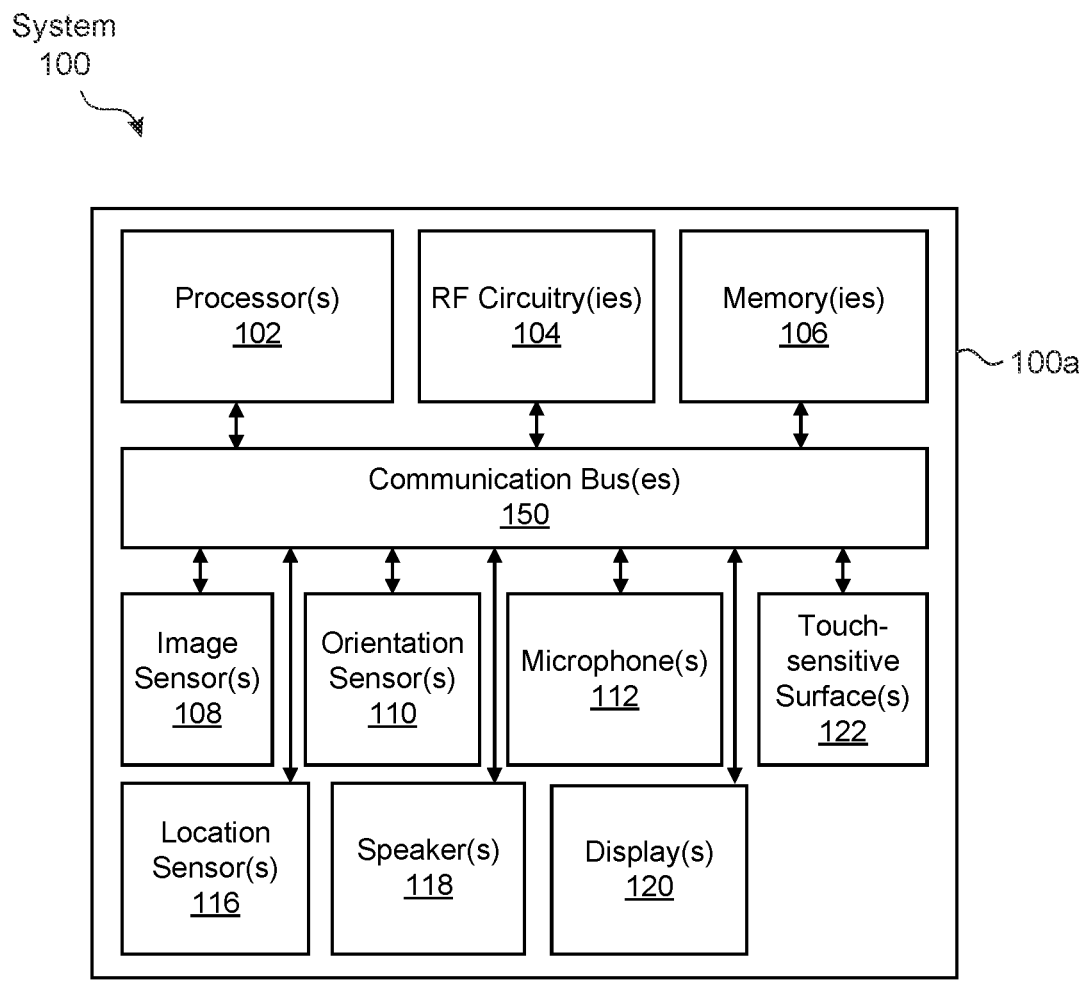
FIGS. 1A-1B depict exemplary systems for use in various computer-generated reality technologies.

The following description sets forth exemplary methods, parameters, and the like. It should be recognized, however, that such description is not intended as a limitation on the scope of the present disclosure but is instead provided as a description of exemplary embodiments.

The present disclosure provides techniques for a user device and external devices to detect and obtain biometric characteristics of the user that include the user's head position, posture, and gaze while the user is viewing user interfaces in a computer-generated reality environment. The measured biometric characteristics are used to determine whether the user's head position is in a range of positions. For example, a user may be viewing a portion of the user interface that causes the user to tilt her/his head down for a prolonged period of time. When a user's head position is determined to be in certain positions, the user interface is moved to a new position so that it can be viewed from a more ergonomic head position. For example, a user interface positioned at the bottom of the computer-generated reality environment, which may strain the user's eyes or neck to look at, is moved higher up in the computer-generated reality environment so that the user interface is now in the user's direct line of sight. Repositioning the user interface leads to the user lifting her/his head up to an ergonomic position from the prior head down position to view the user interface at the new position. In some examples, when the user's head position is within a certain range (e.g., that is of suboptimal ergonomics), a computer-generated reality system moves certain computer-generated reality objects so that they are more ergonomically aligned with the user's line of sight. In some examples, when the user's head position is outside a certain range (e.g., that is of improved ergonomics), a computer-generated reality system moves certain computer-generated reality objects so that they are more ergonomically aligned with the user's line of sight.

As described in additional detail below, users can selectively block use of, or access to, biometric data including head position and posture information. For example, a system that implements the present technology can allow users to "opt in" or "opt out" of the features described herein.

Various embodiments of electronic systems and techniques for using such systems in relation to various computer-generated reality technologies, including virtual reality and mixed reality (which incorporates sensory inputs from a physical environment), are described.

A physical environment (or real environment) refers to a physical world that people can sense and/or interact with without aid of electronic systems. Physical environments, such as a physical park, include physical articles (or physical objects or real objects), such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment (or virtual environment) refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Figure 1B:
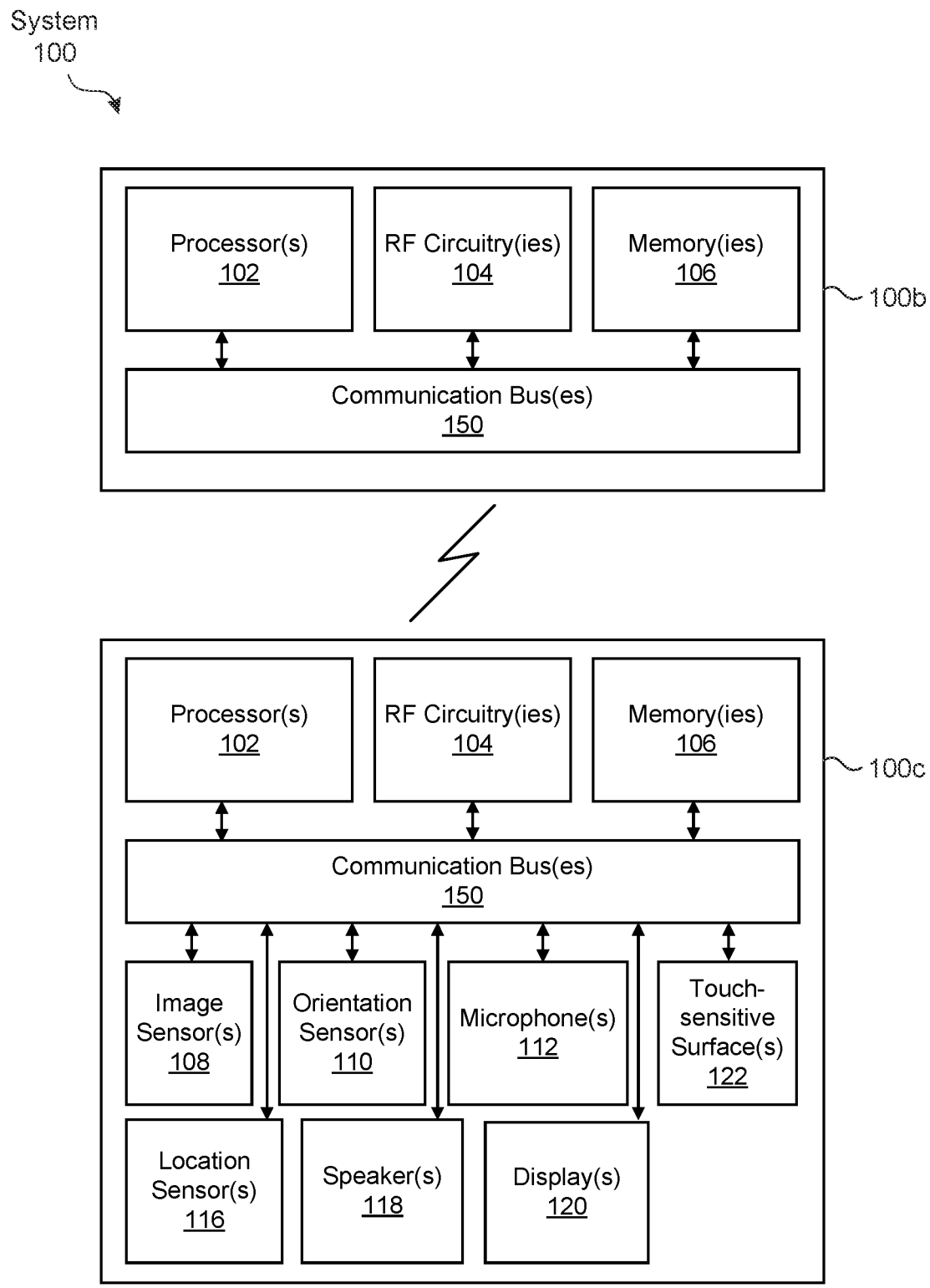

FIG. 1A and FIG. 1B depict exemplary system 100 for use in various computer-generated reality technologies.

In some embodiments, as illustrated in FIG. 1A, system 100 includes device 100a. Device 100a includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100a.

In some embodiments, elements of system 100 are implemented in a base station device (e.g., a computing device, such as a remote server, mobile device, or laptop) and other elements of the system 100 are implemented in a head-mounted display (HMD) device designed to be worn by the user, where the HMD device is in communication with the base station device. In some examples, device 100a is implemented in a base station device or a HMD device.

As illustrated in FIG. 1B, in some embodiments, system 100 includes two (or more) devices in communication, such as through a wired connection or a wireless connection. First device 100b (e.g., a base station device) includes processor(s) 102, RF circuitry(ies) 104, and memory(ies) 106. These components optionally communicate over communication bus(es) 150 of device 100b. Second device 100c (e.g., a head-mounted device) includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100c.

In some embodiments, system 100 is a mobile device. In some embodiments, system 100 is a head-mounted display (HMD) device. In some embodiments, system 100 is a wearable HUD device.

System 100 includes processor(s) 102 and memory(ies) 106. Processor(s) 102 include one or more general processors, one or more graphics processors, and/or one or more digital signal processors. In some embodiments, memory(ies) 106 are one or more non-transitory computer-readable storage mediums (e.g., flash memory, random access memory) that store computer-readable instructions configured to be executed by processor(s) 102 to perform the techniques described below.

System 100 includes RF circuitry(ies) 104. RF circuitry(ies) 104 optionally include circuitry for communicating with electronic devices, networks, such as the Internet, intranets, and/or a wireless network, such as cellular networks and wireless local area networks (LANs). RF circuitry(ies) 104 optionally includes circuitry for communicating using near-field communication and/or short-range communication, such as Bluetooth®.

System 100 includes display(s) 120. In some examples, display(s) 120 include a first display (e.g., a left eye display panel) and a second display (e.g., a right eye display panel), each display for displaying images to a respective eye of the user. Corresponding images are simultaneously displayed on the first display and the second display. Optionally, the corresponding images include the same virtual objects and/or representations of the same physical objects from different viewpoints, resulting in a parallax effect that provides a user with the illusion of depth of the objects on the displays. In some examples, display(s) 120 include a single display. Corresponding images are simultaneously displayed on a first area and a second area of the single display for each eye of the user. Optionally, the corresponding images include the same virtual objects and/or representations of the same physical objects from different viewpoints, resulting in a parallax effect that provides a user with the illusion of depth of the objects on the single display.

In some embodiments, system 100 includes touch-sensitive surface(s) 122 for receiving user inputs, such as tap inputs and swipe inputs. In some examples, display(s) 120 and touch-sensitive surface(s) 122 form touch-sensitive display(s).

System 100 includes image sensor(s) 108. Image sensors(s) 108 optionally include one or more visible light image sensor, such as charged coupled device (CCD) sensors, and/or complementary metal-oxide-semiconductor (CMOS) sensors operable to obtain images of physical objects from the real environment. Image sensor(s) also optionally include one or more infrared (IR) sensor(s), such as a passive IR sensor or an active IR sensor, for detecting infrared light from the real environment. For example, an active IR sensor includes an IR emitter, such as an IR dot emitter, for emitting infrared light into the real environment. Image sensor(s) 108 also optionally include one or more event camera(s) configured to capture movement of physical objects in the real environment. Image sensor(s) 108 also optionally include one or more depth sensor(s) configured to detect the distance of physical objects from system 100. In some examples, system 100 uses CCD sensors, event cameras, and depth sensors in combination to detect the physical environment around system 100. In some examples, image sensor(s) 108 include a first image sensor and a second image sensor. The first image sensor and the second image sensor are optionally configured to capture images of physical objects in the real environment from two distinct perspectives. In some examples, system 100 uses image sensor(s) 108 to receive user inputs, such as hand gestures. In some examples, system 100 uses image sensor(s) 108 to detect the position and orientation of system 100 and/or display(s) 120 in the real environment. For example, system 100 uses image sensor(s) 108 to track the position and orientation of display(s) 120 relative to one or more fixed objects in the real environment.

In some embodiments, system 100 includes microphones(s) 112. System 100 uses microphone(s) 112 to detect sound from the user and/or the real environment of the user. In some examples, microphone(s) 112 includes an array of microphones (including a plurality of microphones) that optionally operate in tandem, such as to identify ambient noise or to locate the source of sound in space of the real environment.

System 100 includes orientation sensor(s) 110 for detecting orientation and/or movement of system 100 and/or display(s) 120. For example, system 100 uses orientation sensor(s) 110 to track changes in the position and/or orientation of system 100 and/or display(s) 120, such as with respect to physical objects in the real environment. Orientation sensor(s) 110 optionally include one or more gyroscopes and/or one or more accelerometers.

With reference to FIGS. 2A-2E, exemplary techniques for determining a user's head position while the user is viewing a displayed user interface in a CGR environment and repositioning the position of the user interface to cause the user to move her/his head to a more optimal ergonomic position are illustrated.

Figure 2A:
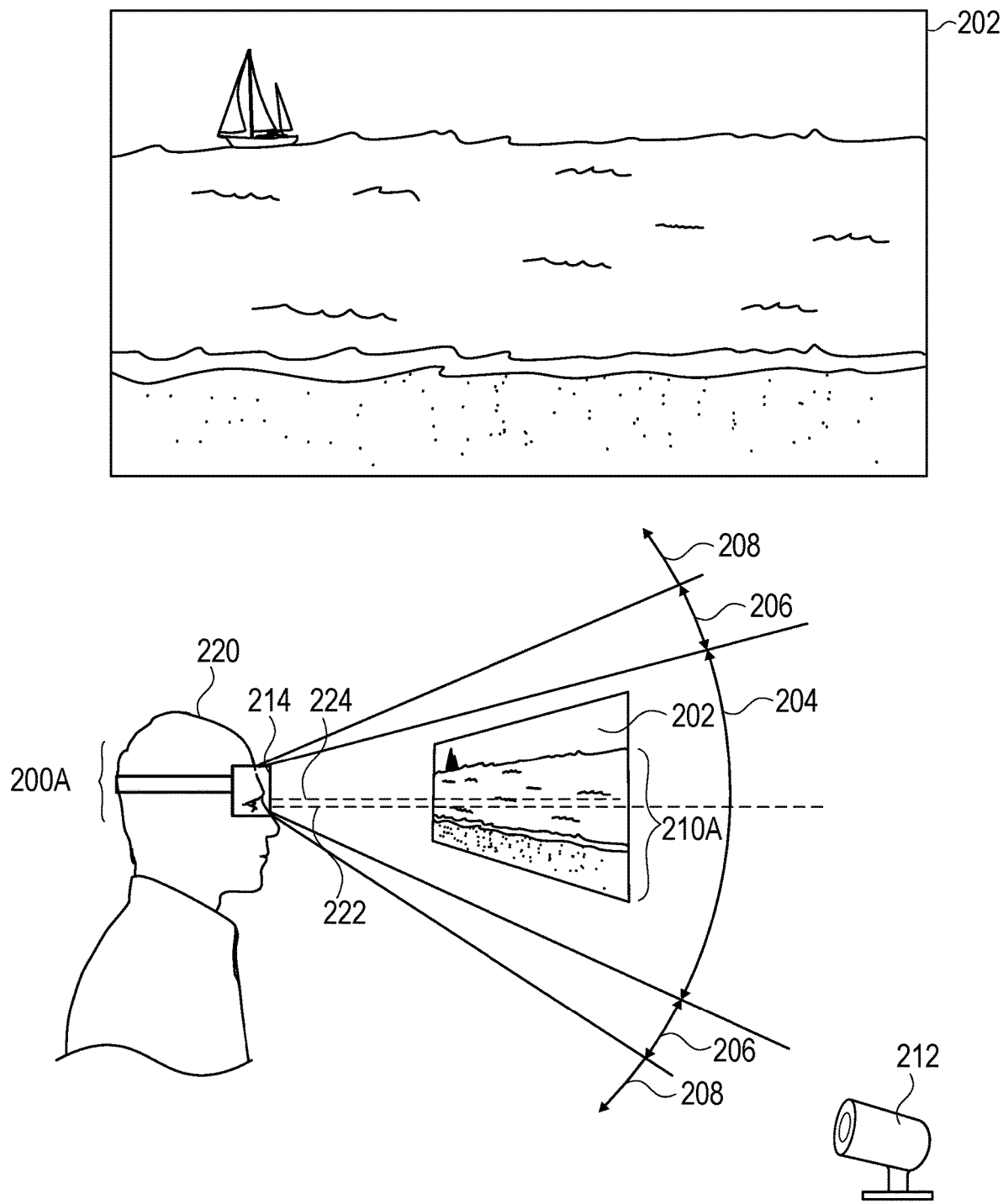
FIGS. 2A-2E depict an example of determining when the user is viewing a user interface in a computer-generated reality environment at an un-ergonomic head position and repositioning the user interface so that it can be viewed from a more comfortable and/or ergonomic head position.

In FIG. 2A, user 220 views exemplary user interface 202 at position 210A in an exemplary CGR environment at head position 200A. In some embodiments, user interface 202 includes CGR content displayed in a CGR environment. In some embodiments, the user's head position 200A is in an ergonomic position 200A, while user 220 is viewing user interface 202 at corresponding first position 210A in the CGR environment. In some embodiments, the user's head position moves to an un-ergonomic position (e.g., head position 200B and 200C), while user 220 is viewing exemplary user interface 202 at corresponding first position 210A in the CGR environment. Although FIGS. 2A-2E are primarily described with respect to exemplary user interface 202, the same (or similar) technique can more generally be employed for positioning, repositioning, and viewing one or more virtual objects, rather than (or in addition to) user interface 202. For example, a virtual object can be positioned and/or repositioned in the CGR environment, rather than user interface 202.

While user 220 is viewing user interface 202, user head position 200A is detected by one or more sensors 212. In some embodiments, the one or more sensors 212 include an infrared camera sensor or a visible light sensor. In some embodiments, the one or more sensors 212 are part of an external device 212, such as an external camera. In some embodiments, the one or more sensors are integrated into a head mounted display (HMD) 214 worn by user 220. In some embodiments, the head position is measured by sensors on external device 212 and provided to HMD 214. In some embodiments, user 220's head position 200A is measured directly by sensors in HMD 214 using an accelerometer or a gyroscope to determine the position of the user's head.

In some embodiments, exemplary user interface 202 is displayed at first position 210A within the computer-generated reality environment based on the positioning of the current, detected head position 200A. In some embodiments, HMD 214 uses the detected head position 200A to determine a first position 210A at which exemplary user interface 202 is displayed in the computer-generated reality environment. In some embodiments, HMD 214 uses detected gaze information and/or user posture to determine the first position 210A at which exemplary user interface 202 is displayed in the computer-generated reality environment. In some embodiments, displaying user interface 202 at first position 210A results in exemplary user interface 202 being visible to user 220 at head position 200A.

Figure 2B:
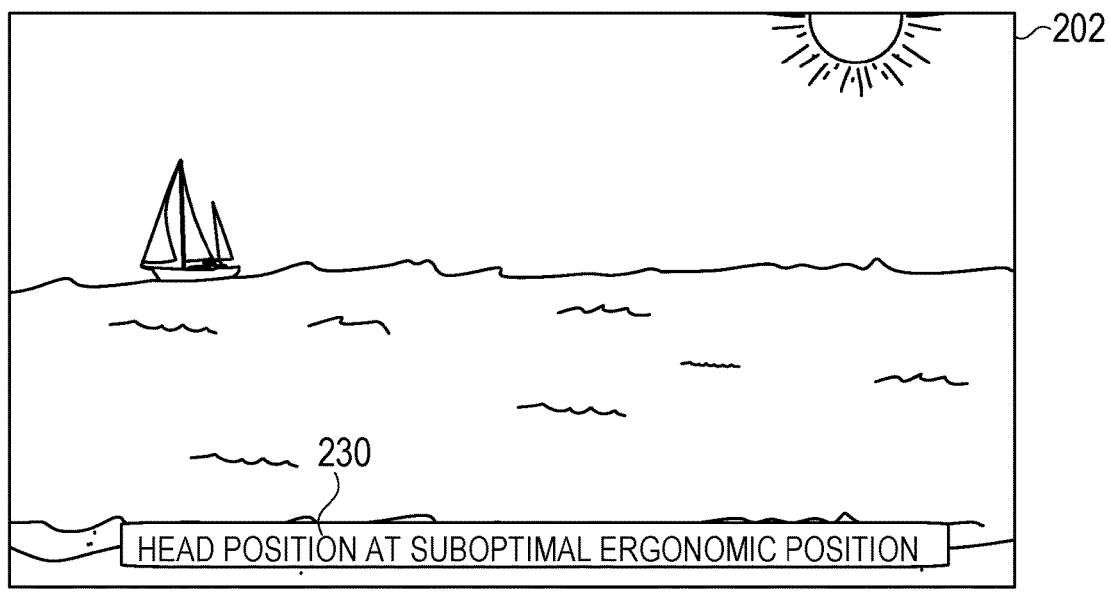
Figure 2B:
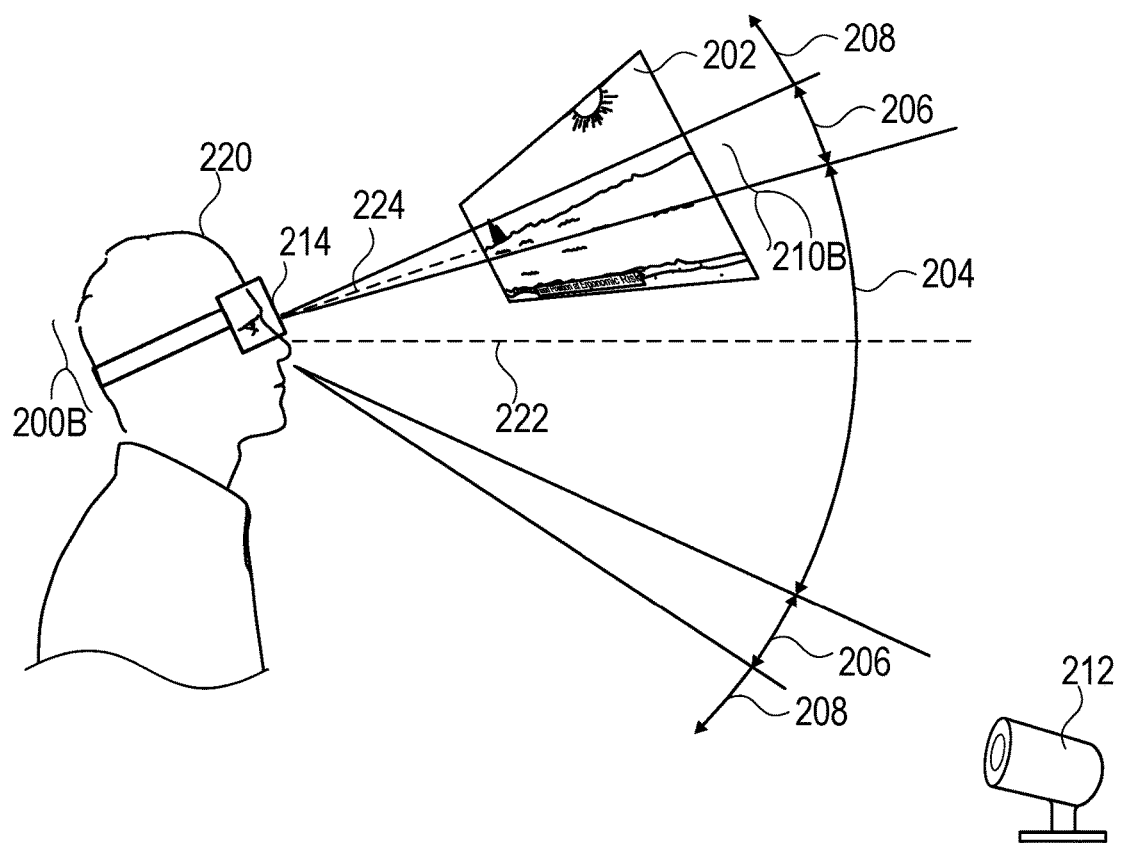

In FIG. 2A, user's head position 200A is within a range of head positions 204 that correspond to a set of desirable, ergonomic head positions (e.g., an ergonomic range). In some embodiments, the ergonomic range of head positions 204 is a set of head positions that are comfortable for viewing exemplary user interface 202 at position 210A. In some embodiments, the ergonomic range of head positions 204 includes the set of head positions in which the angle between the user's line of sight 224 at the particular head position 200A and the forward vector 222 is within a first threshold number of degrees. For example, when the user's head position is at position 200A, where the line of sight 224 is parallel to the forward vector 222 as illustrated in FIG. 2A, the number of degrees between the line of sight 224 and the forward vector 222 is zero degrees. In some examples, when the user's head is in a tilted position (e.g., position 200B, 200C), the angle between the user's line of sight 224 and the forward vector 222 is more than zero degrees (e.g., 15 degrees) as illustrated in FIG. 2B. In some embodiments, the threshold number of degrees is based on the degree of change in yaw, pitch, or roll or a combination of the characteristics from the forward vector 222. In some embodiments, the ergonomic range of head positions 204 is based on additional characteristics such as the user's gaze and posture.

Figure 2C:
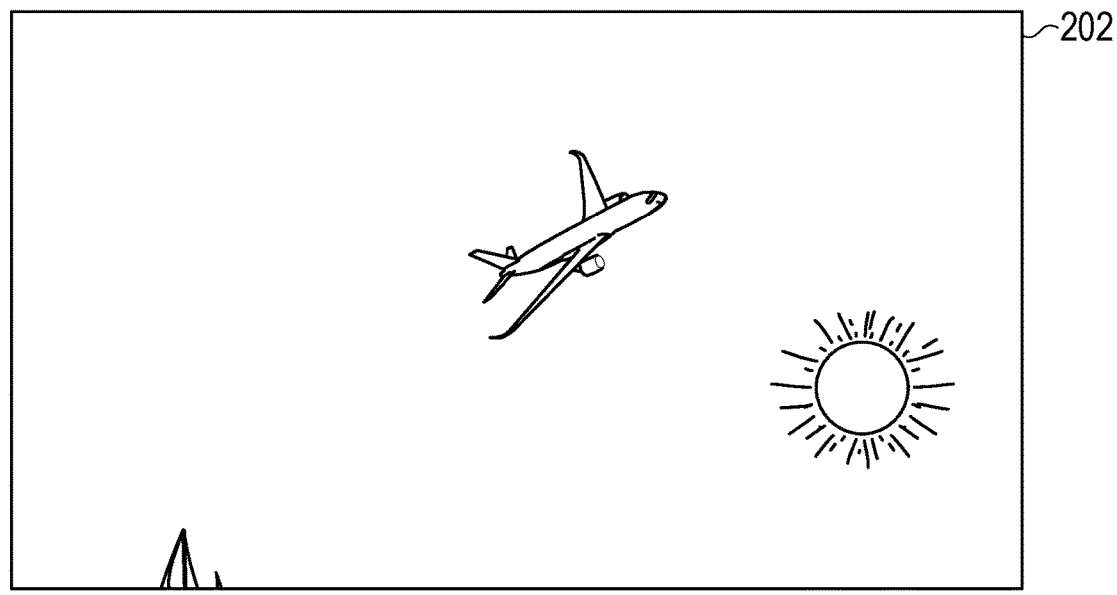
Figure 2C:
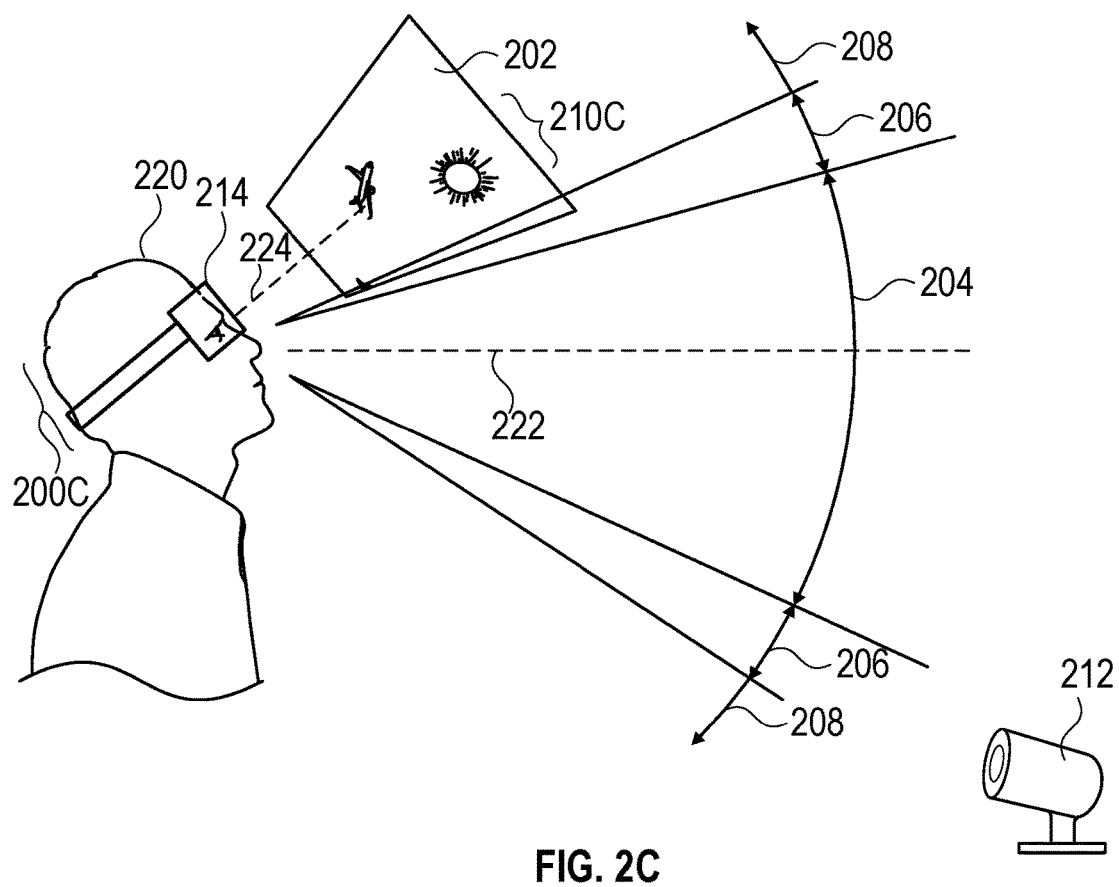

In some embodiments, user 220 is looking at exemplary user interface 202 that causes user 220 to move her/his head position 200A to a head position (e.g., 200B and 200C) that is outside the ergonomic range of head positions 204 (e.g., ranges 206 and 208) as illustrated in FIGS. 2B and 2C. In some embodiments, a head position is located outside the ergonomic range of head positions 204 when the pitch of the user's head position (e.g., tilt of the head in an upwards or downwards direction) exceeds a threshold number of degrees. In some embodiments, a head position is located outside the ergonomic range of head positions 204 when the roll of the user's head position (e.g., when the user tilts her/his head left or right) exceeds a threshold number of degrees. In some embodiments, a head position is located outside the ergonomic range of head positions 204 when the yaw of the user's head position (e.g., when the user turns her/his head left or right) exceeds a threshold number of degrees.

In some embodiments, when the user's head position is outside the ergonomic range of head positions 204, the user interface 202 is moved to a new position so that the user can view user interface 202 from a more ergonomic head position (e.g., head position 200A and 200D). In some embodiments, HMD 214 determines whether to move user interface 202 to a new position. In some embodiments, HMD 214 uses an application programming interface (API) to obtain information regarding when the user's head position is outside the ergonomic range of head positions 204. In some embodiments, HMD 214 uses an API to notify the application associated with user interface 202 to reposition the position of user interface 202 when the user's head position is detected to be outside the ergonomic range of head positions. In some embodiments, applications obtain gaze information, information relating to posture, and information relating to the user's head position through an API.

In FIG. 2B, user 220 is looking upward at exemplary user interface 202 at position 210B causing user 220 to move her/his head to head position 200B, which is in a warning range of positions 206 that is outside the ergonomic range of head positions 204. In some embodiments, the warning range of positions 206 includes head positions that are in a range between a head position at the boundary of the ergonomic range of head positions 204 and a head position at the boundary of the undesirable range of head positions 208. In some embodiments, the warning range of head positions 206 includes a set of head positions that are a threshold number of degrees from a head position within the ergonomic range of head positions. In some embodiments, a subset of the head positions within the warning range of positions 206 are also in the ergonomic range of head positions 204. In some embodiments, the set of head positions in the warning range of head positions 206 is a subset of the set of head positions in the ergonomic range of head positions 204. In some embodiments, the set of head positions within the warning range of positions 206 are mutually exclusive with the set of head positions in the ergonomic range of head positions 204. In some embodiments, the warning range of positions 206 includes a set of head positions that are also in the undesirable range of positions 208. In some embodiments, the set of head positions within the warning range of positions 206 is a subset of the set of head positions within the undesirable range of positions 208. In some embodiments, the head positions within the warning range of positions 206 are mutually exclusive with the head positions in the undesirable range of positions 208.

In FIG. 2B, in accordance with a determination that user's head position 200B is located in the warning range of positions 206, notification 230 is displayed in exemplary user interface 202, indicating that user's head position 200B is in an un-ergonomic position. In some embodiments, notification 230 includes information indicating that user 220 should move her/his head position to a more ergonomic position (e.g., head position 200D.) In some embodiments, notification 230 provides details regarding the position in which user 220 should move her/his head to be in a more ergonomic position. In some embodiments, notification 230 is displayed when the user's head position has been positioned in an un-ergonomic position (e.g., head position 200B) within the warning range of positions 206 beyond a threshold period of time. In some embodiments, the user may dismiss the notification 230 without moving her/his head position.

FIG. 2C illustrates when user 220 is looking upward at exemplary user interface 202 at position 210C causing user 220 to move her/his head position 200C to be in an undesirable range of positions 208 that is beyond the warning range of positions 206. In some embodiments, the un-ergonomic range of positions 208 includes a set of head positions that are outside the boundary of the ergonomic range of head positions 204. In some embodiments, the un-ergonomic range of head positions 208 includes a set of head positions that are a threshold number of degrees from a head position within the ergonomic range of head positions. In some embodiments, the un-ergonomic range of head positions 208 includes a set of head positions that are a threshold number of degrees from a head position within the warning range of head positions.

In some embodiments, in accordance with a determination that user's head position 200C is located in the undesirable range of positions 208, notification 230 is displayed in exemplary user interface 202, indicating that user's 220 head position 200C is in an un-ergonomic position. In some embodiments, notification 230 informs user 220 that user 220 should move her/his head position to a more ergonomic position (e.g., head position 200D). In some embodiments, notification 230 is displayed when the user's head position has been positioned in an un-ergonomic position (e.g., head position 200C) within the undesirable range of positions 208 beyond a threshold period of time. In some embodiments, the user may dismiss the notification 230 without moving her/his head position.

Figure 2D:
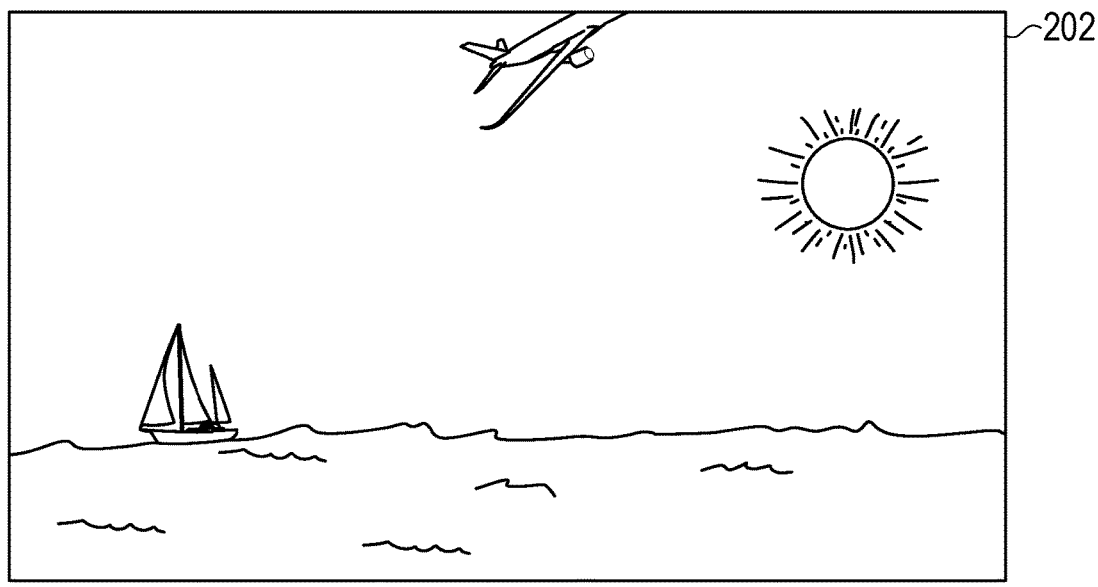
Figure 2D:
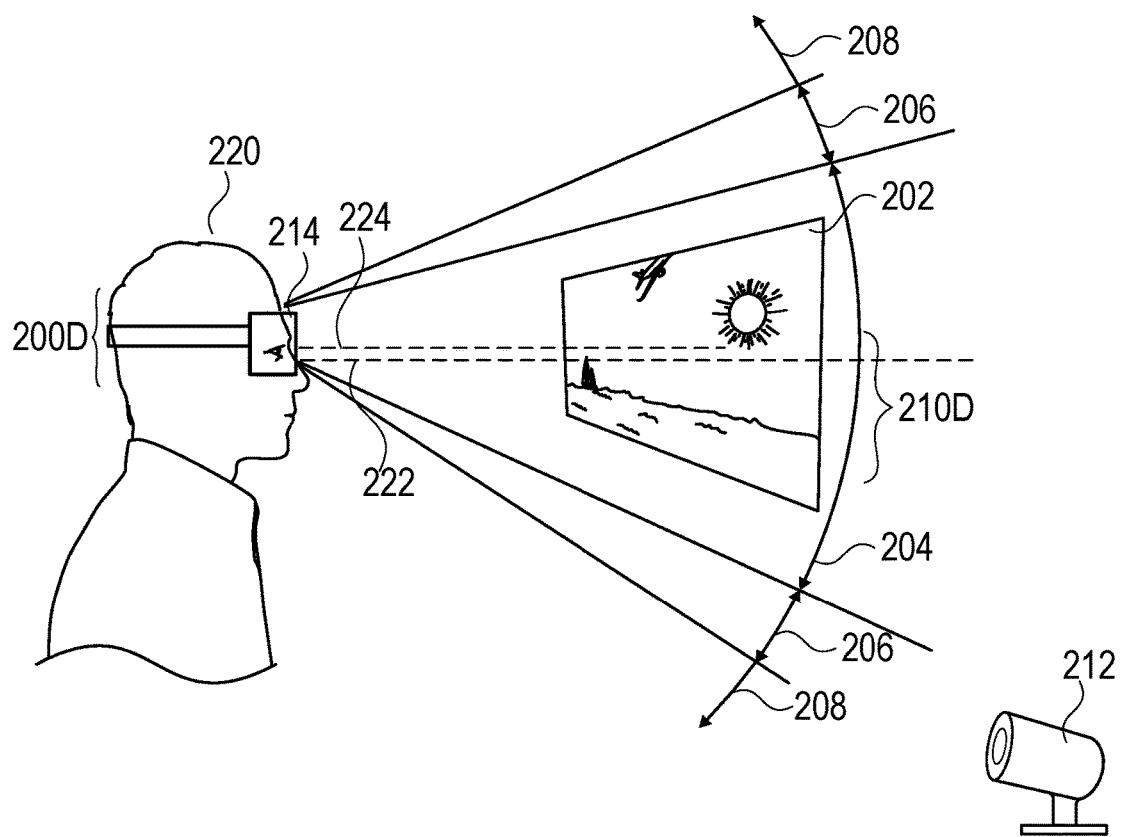

In FIG. 2D, exemplary user interface 202 is repositioned to a second position (e.g., position 210D) so that user 220 will move her/his head to a new head position (e.g., head position 200D) that is in an ergonomic position that is within the ergonomic range of positions 204. In some embodiments, user interface 202 is viewable from the ergonomic, second position (e.g., position 210D) but is not viewable or only partially viewable from the un-ergonomic first head position (e.g., position 210B or 210C). In some embodiments, if the user's head position 200A is already in an ergonomic position that is within the ergonomic range of positions 204, then the user interface 202 is not repositioned to the second position. In some embodiments, the second head position is determined by determining a head position that would cause the user to change her/his posture to an ergonomic posture. In some embodiments, the angle between the user's head with respect to the user's neck and spine are used to determine a head position that would result in good posture. In some embodiments, the second head position permits a line of sight 224 within a threshold number of degrees from the forward vector 222. In some embodiments, the threshold number of degrees is predetermined.

Figure 2E:
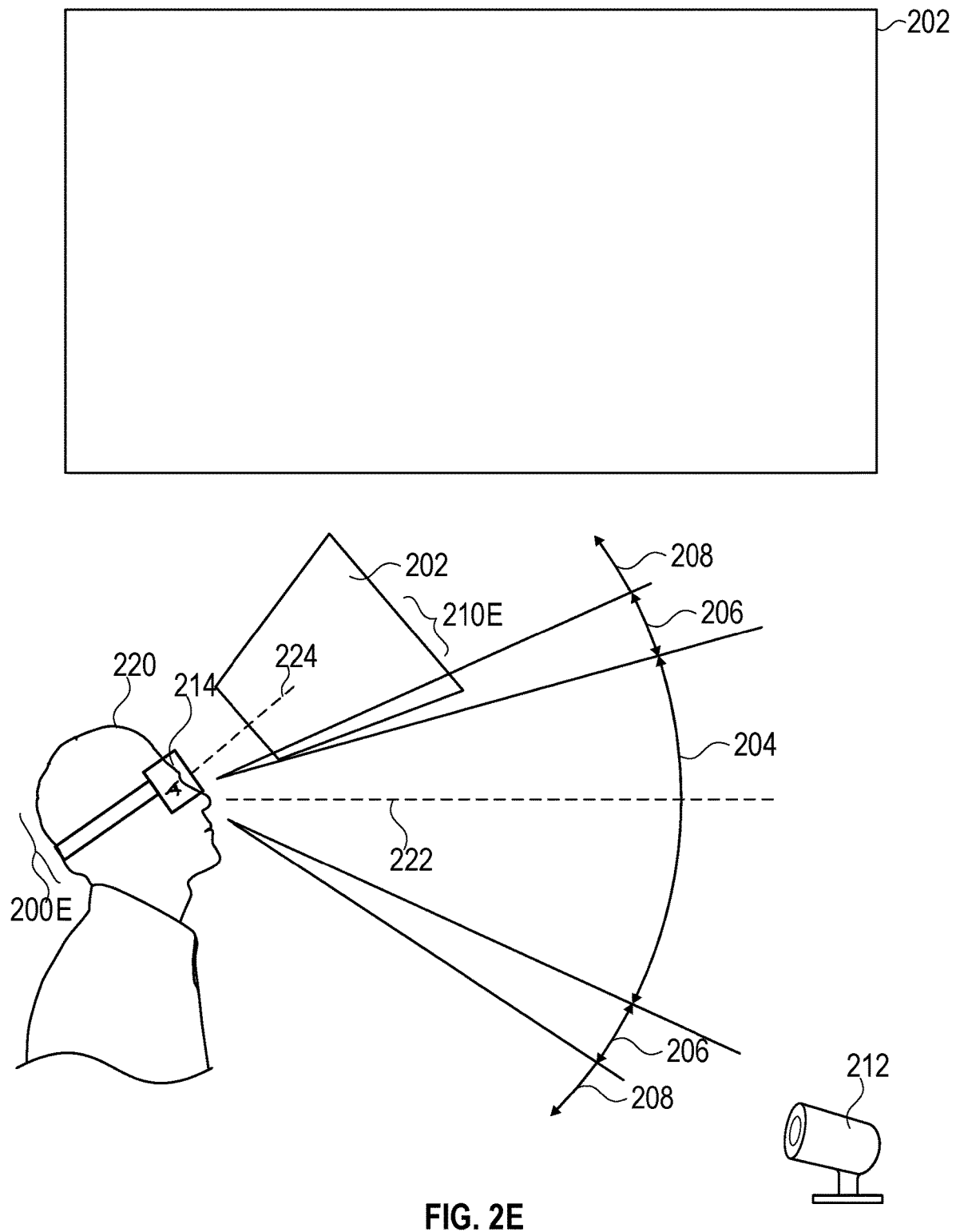

In FIG. 2E, when the user's head position is determined to be in an un-ergonomic head position 200E, user interface 202 ceases being displayed instead of being repositioned. In some embodiments, if the user has not moved her/his head from the un-ergonomic head position 200E for a threshold period of time, user interface 202 ceases being displayed. In some embodiments, if the user has not moved her/his head after a threshold period of time after a notification 230 warning the user that the user's head position is in an un-ergonomic position has been displayed, user interface 202 ceases being displayed. In some embodiments, instead of ceasing display of user interface 202, the computer-generated reality environment ceases being displayed. In some embodiments, HMD 214 sends an indication to an application associated with user interface 202 to cease being displayed.

Figure 3A:
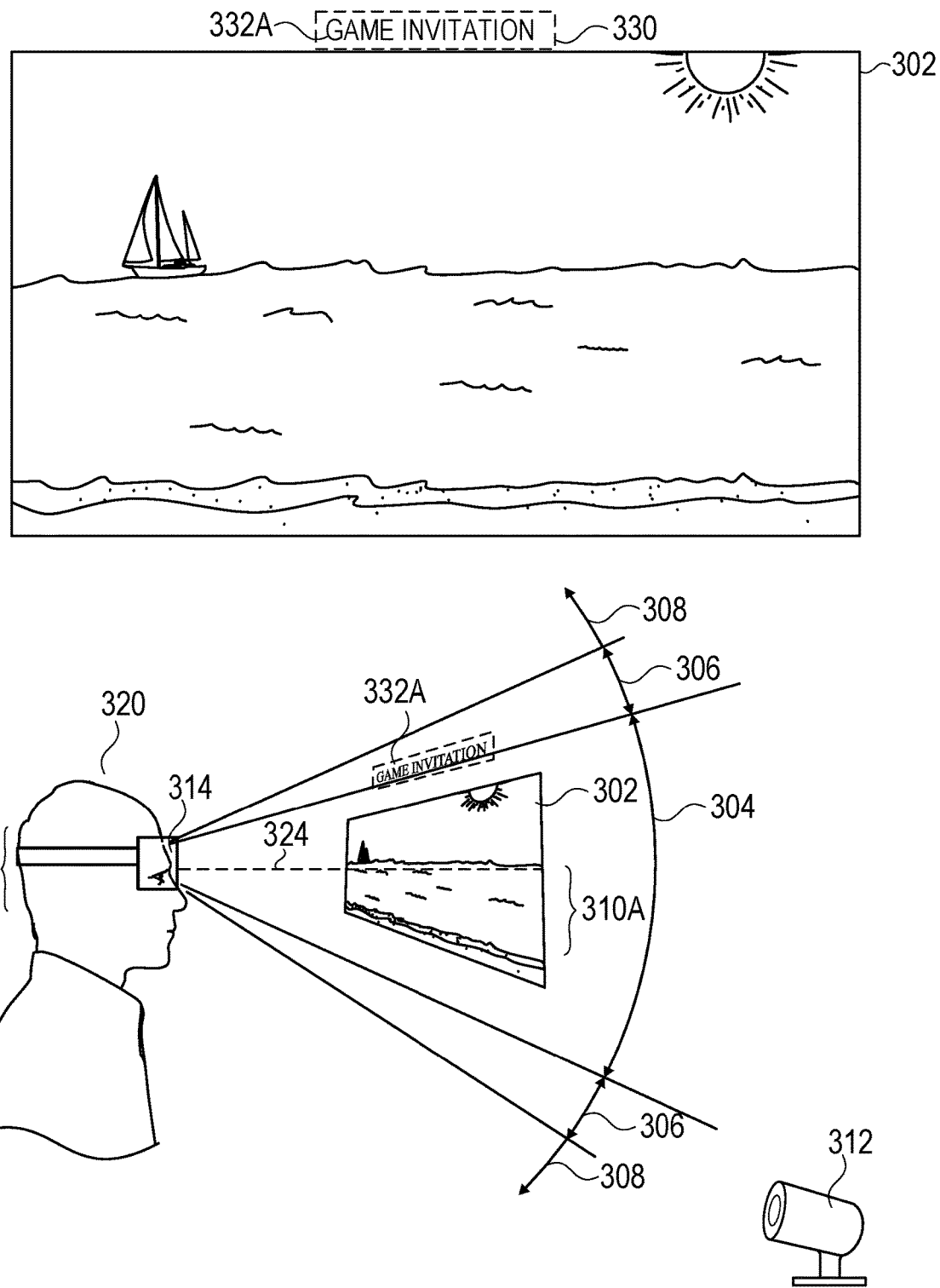
FIGS. 3A-3C depict an example of repositioning a notification that is displayed in an un-ergonomic viewing position relative to the position of a displayed user interface so that the notification can be viewed from a more ergonomic head position.
Figure 3B:
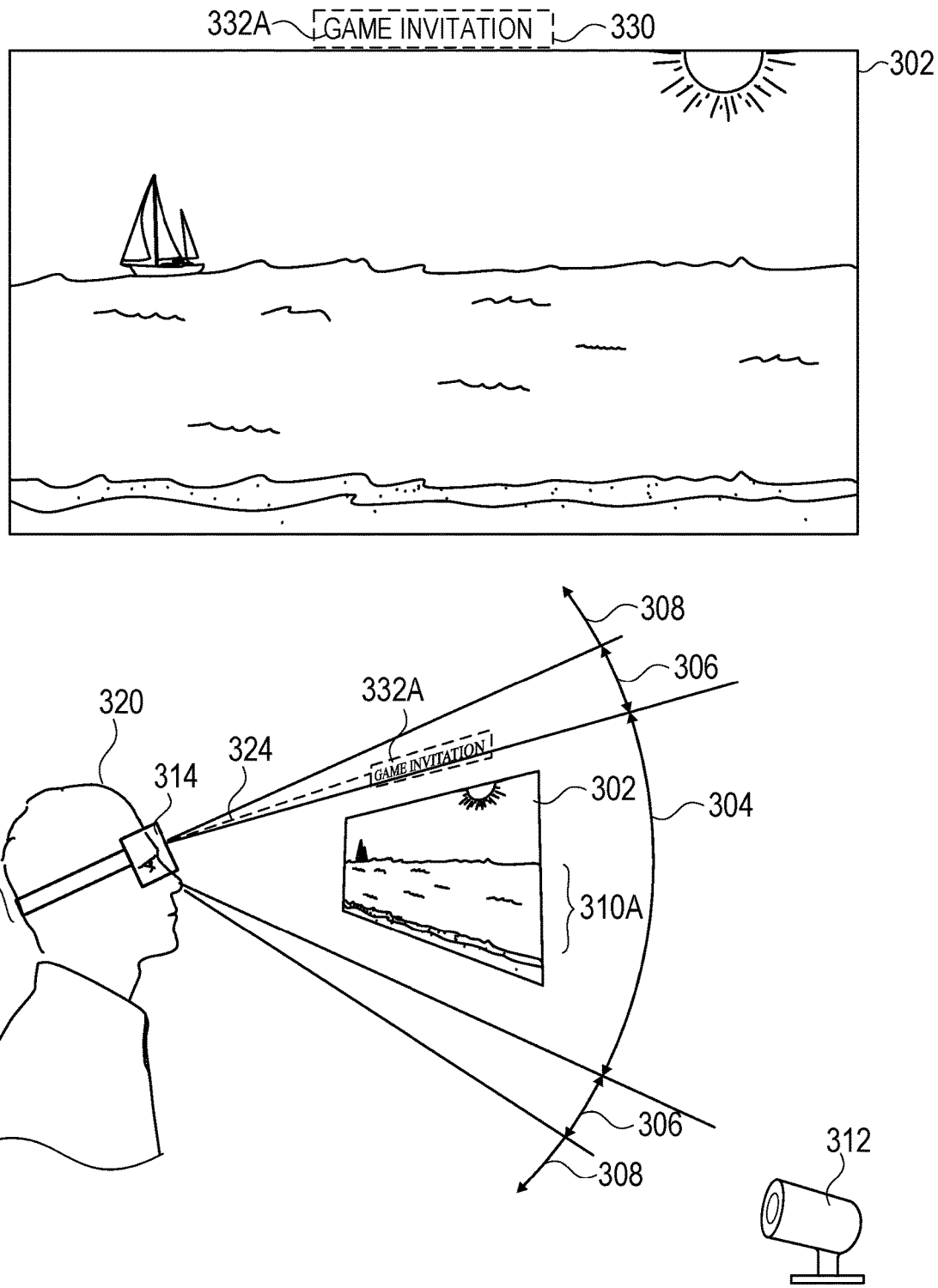
Figure 3C:
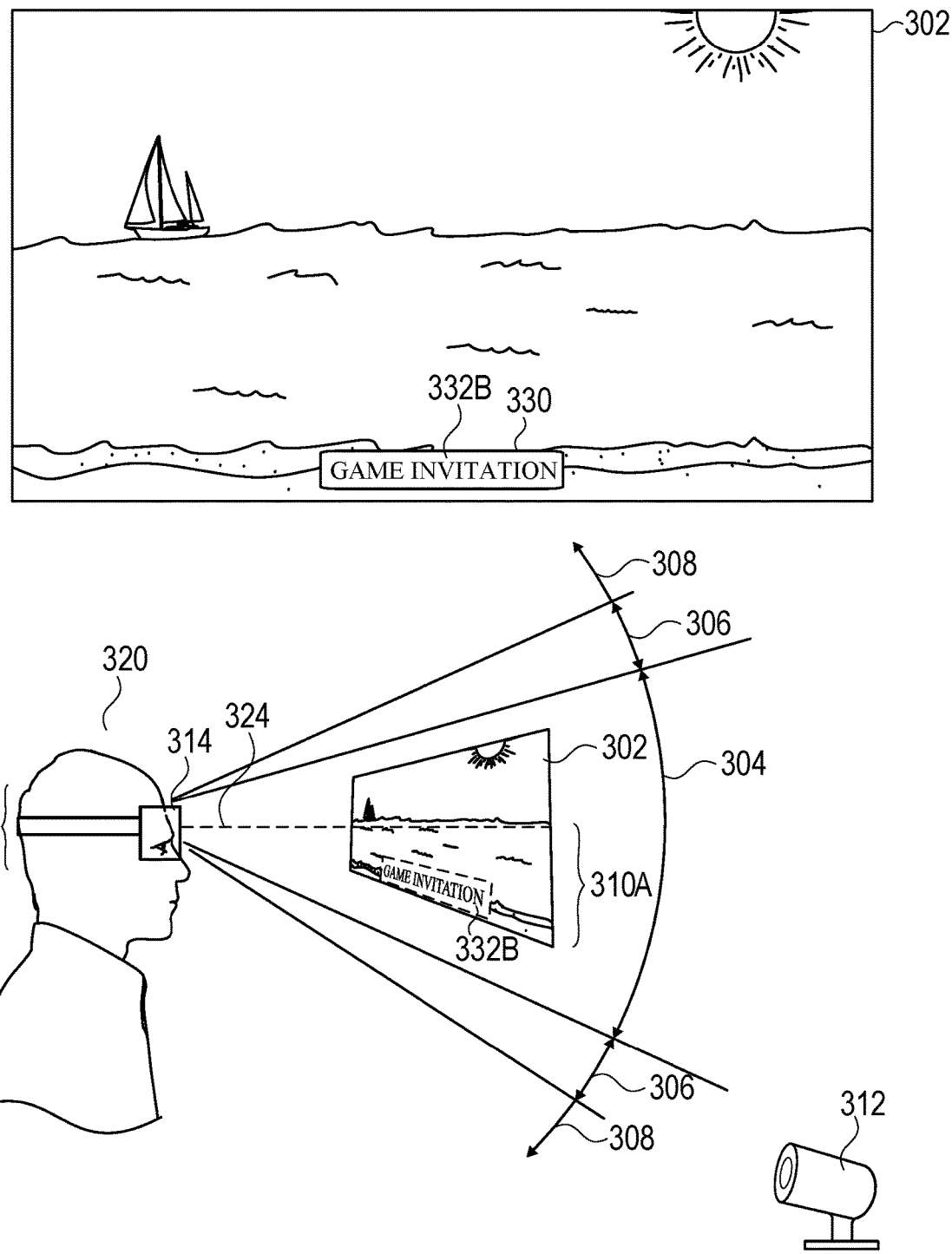

FIGS. 3A-3C illustrate when incoming notification 330 from a second application is received while user 320 is viewing user interface 302 associated with a first application that is positioned at first position 310A. In some embodiments, the first application and the second application are the same application. In some embodiments, the second application that notification 330 is associated with is a different application than the application associated with user interface 302. Although FIGS. 3A-3C are primarily described with respect to exemplary user interface 302, the same (or similar) technique can more generally be employed for positioning, repositioning, and viewing one or more virtual objects, rather than (or in addition to) user interface 302. For example, a virtual object can be positioned and/or repositioned in the CGR environment, rather than user interface 302.

As illustrated in FIG. 3A, received notification 330 is positioned at position 332A, which is not at an ergonomic viewing position corresponding to the user's current head position 300A. In some embodiments, notification 330 is not viewable from ergonomic head position 300A, while user interface 302 is at position 310A that corresponds to ergonomic head position 300A. In some embodiments, notification 330 is displayed while the user is looking at user interface 302A at position 310A.

In FIG. 3B, in response to displaying the notification 330, user 320 tilts her/his head to new head position 300B, which is within the warning range of positions 306 or the un-ergonomic range of positions 308, in order to look at notification 330 at position 322A, while user interface 302 remains in original position 310B. In some embodiments, notification 330 is not visible from a field of view from the user's line of sight 324 without the user having to move her/his head from head position 300A to head position 300B. In some embodiments, notification 330 and user interface 302 are not visible from user head position 300B. In some embodiments, user interface 302 is partially visible from user head position 300B. In some embodiments, HMD 314 detects the position of notification 330 using an API.

FIG. 3C illustrates in accordance with detecting that the notification is not in an ergonomically viewable position, HMD 314 repositions notification 330 to new position 332B, so that the user may view notification 330 without moving her/his head from the current head position 300A. In some embodiments, user interface 302 stays in the same position 310A as the notification is moved from position 332A to position 332B. In some embodiments, in accordance with a determination that the user's head position is in un-ergonomic position 300B, HMD 314 repositions notification 330 to new position 332B without moving user interface 302 from position 310A so that it is viewable from an ergonomic head position 300A. In some embodiments, notification 330 is repositioned to position 332B from position 332A after user interface 302 is moved to a position 310A that is viewable from an ergonomic head position 300C. In some embodiments, notification 330 is repositioned from position 332A that is outside of user interface 302 to a second position 332B that is within user interface 302.

In some embodiments, the technique does not position notification 330 at position 332A and, instead, directly positions notification 330 at position 332B, instead. The technique receives a request to position notification 330 in the CGR environment. For example, the technique determines an initial position 332A as the position at which to position notification 330 (e.g., without actually positioning notification 330 at position 332A in the CGR). For another example, the request to position notification 330 specifies initial position 332A as the position at which to position notification 330. In some embodiments, the technique determines (e.g., by analyzing position 332A with respect to ergonomic and/or un-ergonomic head positions) whether positioning notification 330 at initial position 332A would require user's 320 head position to be in un-ergonomic position in order to view notification 330. In accordance with a determination that positioning notification 330 at position 332A would not require user's 320 head position to be in un-ergonomic position in order to view notification 330, the technique positions notification 330 at position 332A (e.g., without also placing notification 330 at position 332B). In accordance with a determination that positioning notification 330 at position 332A would require user's 320 head position to be in un-ergonomic position in order to view notification 330, the technique positions notification 330 at a position (e.g., position 332B) different from initial position 332A (and without also placing notification 330 at position 332A). Accordingly, the technique positions notification 330 within the CGR environment at a position that it is ergonomically viewable. Alternatively, in some embodiments, in accordance with the determination that positioning notification 330 at position 332A would require user's 320 head position to be in un-ergonomic position in order to view notification 330, the technique forgoes positioning notification 330 in the CGR environment (e.g., does not position notification 330 at initial position 332A and does not position notification 330 at a different position, such as position 332B). Accordingly, the technique positions notification 330 within the CGR environment at a position that requires un-ergonomic viewing.

Figure 4A:
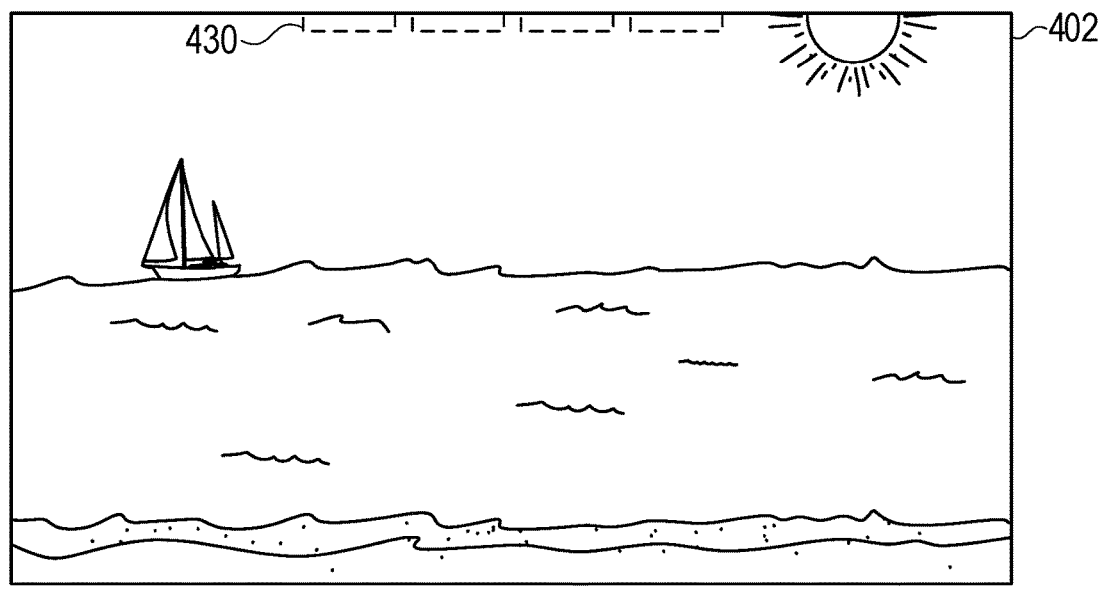
FIGS. 4A-4F depict an example of determining whether a user is looking at a component that is at the edge of or beyond a user interface that is in an un-ergonomic viewing position and repositioning the component within the user interface so that it can be viewed from a more ergonomic head position.
Figure 4A:
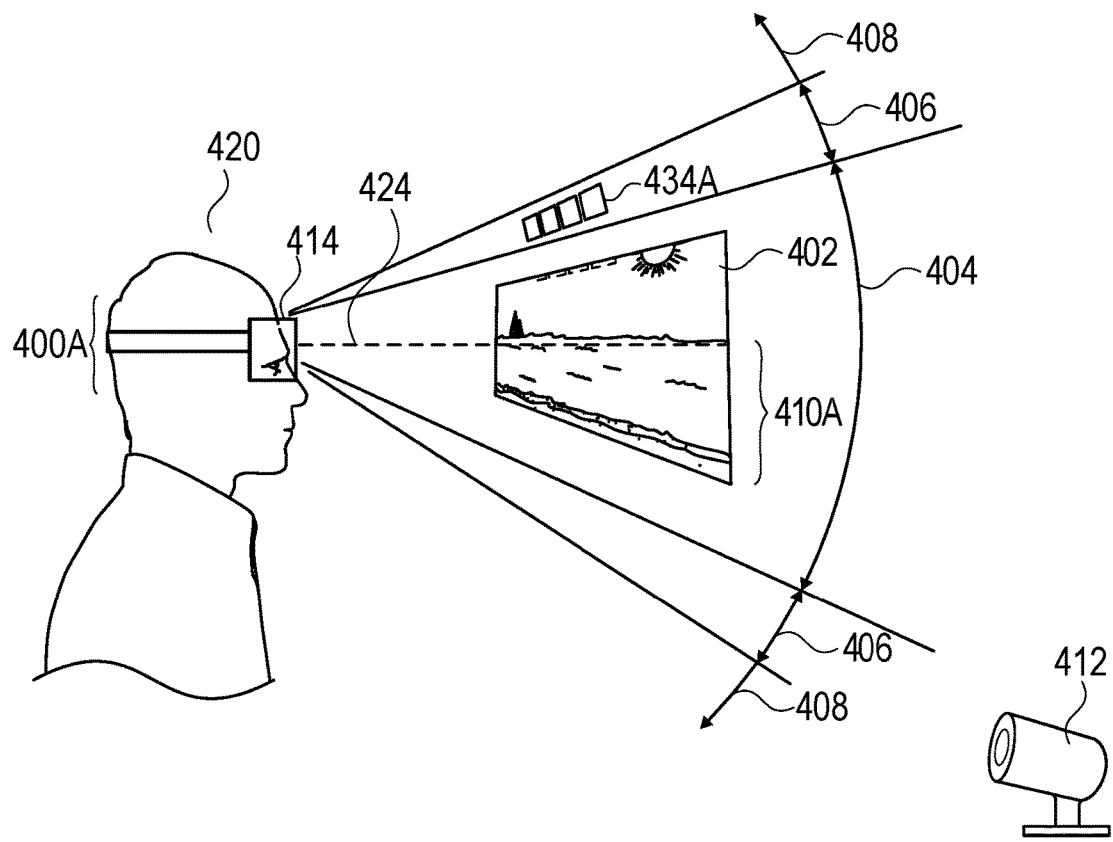

FIGS. 4A-4F illustrate repositioning user interface objects (e.g., icons) 430 within user interface 402 when HMD 414 determines that user 420 is looking at user interface objects 430 at a head position (e.g., head position 400B, 400E) that is not within the ergonomic range of head positions 404. FIG. 4A illustrates user interface objects 430 positioned along the top edge of user interface 402 at position 434A, while user interface 402 is positioned at position 410A, which corresponds to an ergonomic head position 400A. In some embodiments, when user interface objects 430 are (fully and/or at least partially) positioned in the CGR environment at a position that is not ergonomically viewable from the current head position 400A, an indication (e.g., outline, partial outline, dotted representation) of the user interface objects is displayed (e.g., at an ergonomically viewable position) instead of the actual user interface objects (e.g., at the un-ergonomically viewable position). In some embodiments, a user interface object is at a position that is not visible from the current head position when at least a portion of the user interface object is not visible from the current head position (even if a portion of the user interface object is visible). In some embodiments, a user interface object is at a position that is not visible from the current head position when the entire user interface object is not visible from the current head position. In some embodiments, user interface objects 430 are positioned outside user interface 402 in the CGR environment. In some embodiments, user interface objects 430 are positioned in a position that corresponds to a head position 400B within the warning range of head positions 406. In some embodiments, user interface objects 430 are positioned in a position that corresponds to a head position within the un-ergonomic range of head positions 408. Although FIGS. 4A-4F are primarily described with respect to exemplary user interface 402 and exemplary user interface objects 430, the same (or similar) technique can more generally be employed for positioning, repositioning, and viewing virtual objects, rather than (or in addition to) user interface 402 and user interface objects 430. For example, a first virtual object can be positioned and/or repositioned in the CGR environment, rather than user interface 402. For another example, one or more second virtual objects can be positioned and/or repositioned in the CGR environment, rather than user interface objects 430.

Figure 4B:
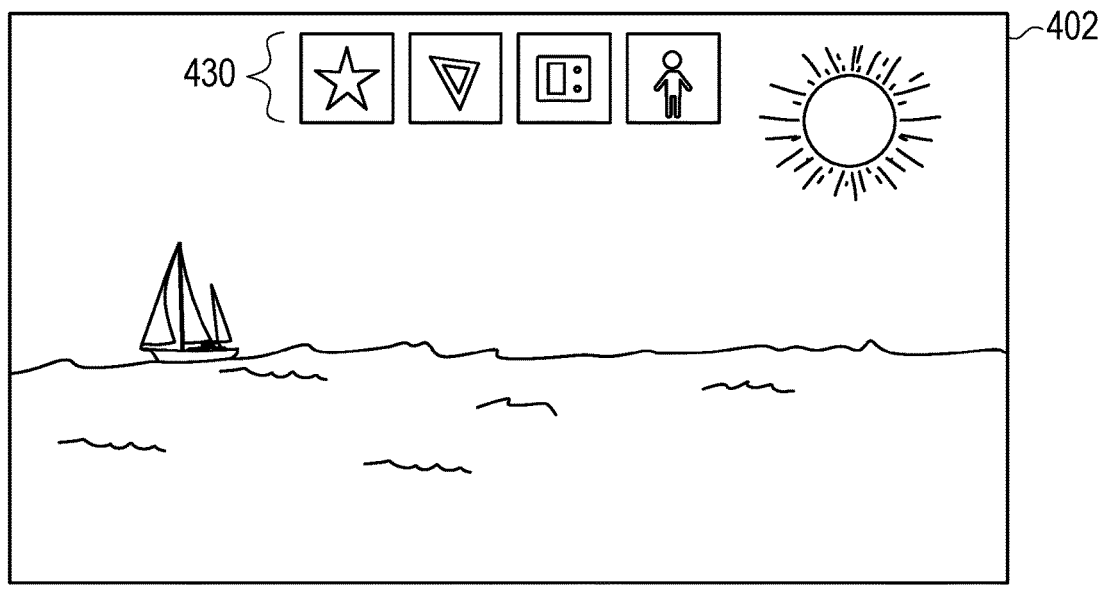
Figure 4B:
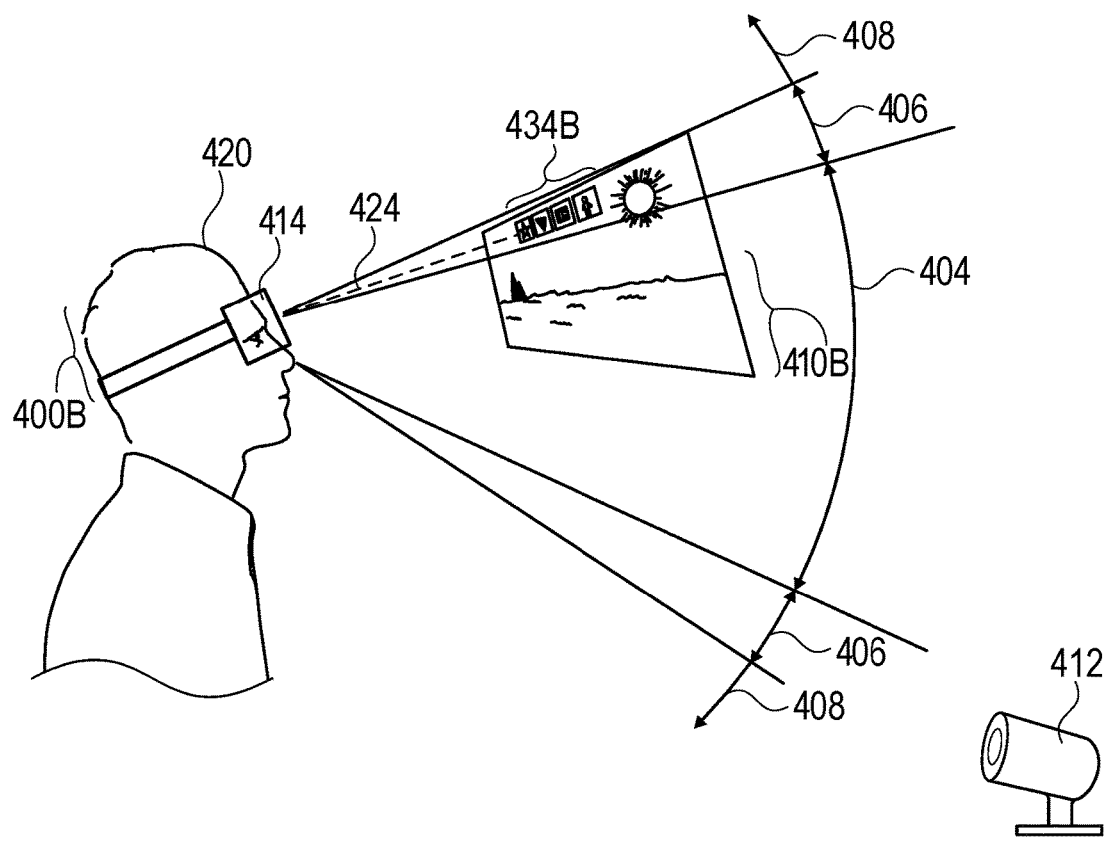

At FIG. 4B, user 420 moves her/his head from head position 400A to head position 400B to bring user interface objects 430 into view (e.g., within a field of view from the line of sight 424) at position 434B along with user interface 402 at position 410B. Note that the view in user interface 402 has changed from FIG. 4A to 4B based on detecting the change in head position from head position 400A to head position 400B. In some embodiments, once user interface objects 430 are fully in view, the display of user interface objects 430 changes from an outline of the user interface objects to the actual user interface objects. In some embodiments, user 420 moves her/his head from ergonomic head position 400A to an un-ergonomic head position 400B to view user interface objects 430 at position 434B. In some embodiments, user interface objects 430 are positioned at positions (e.g., position 434B) that cause user 420 to move her/his head to a head position within the warning range of head positions 406. In some embodiments, user interface objects 430 are positioned at positions (e.g., position 434B) that cause user 420 to move her/his head to a head position 400B within the un-ergonomic range of head positions 408. In some embodiments, a notification 330 is displayed when user 420 moves her/his head to a head position 400B that is outside the ergonomic range of head positions 404.

Figure 4C:
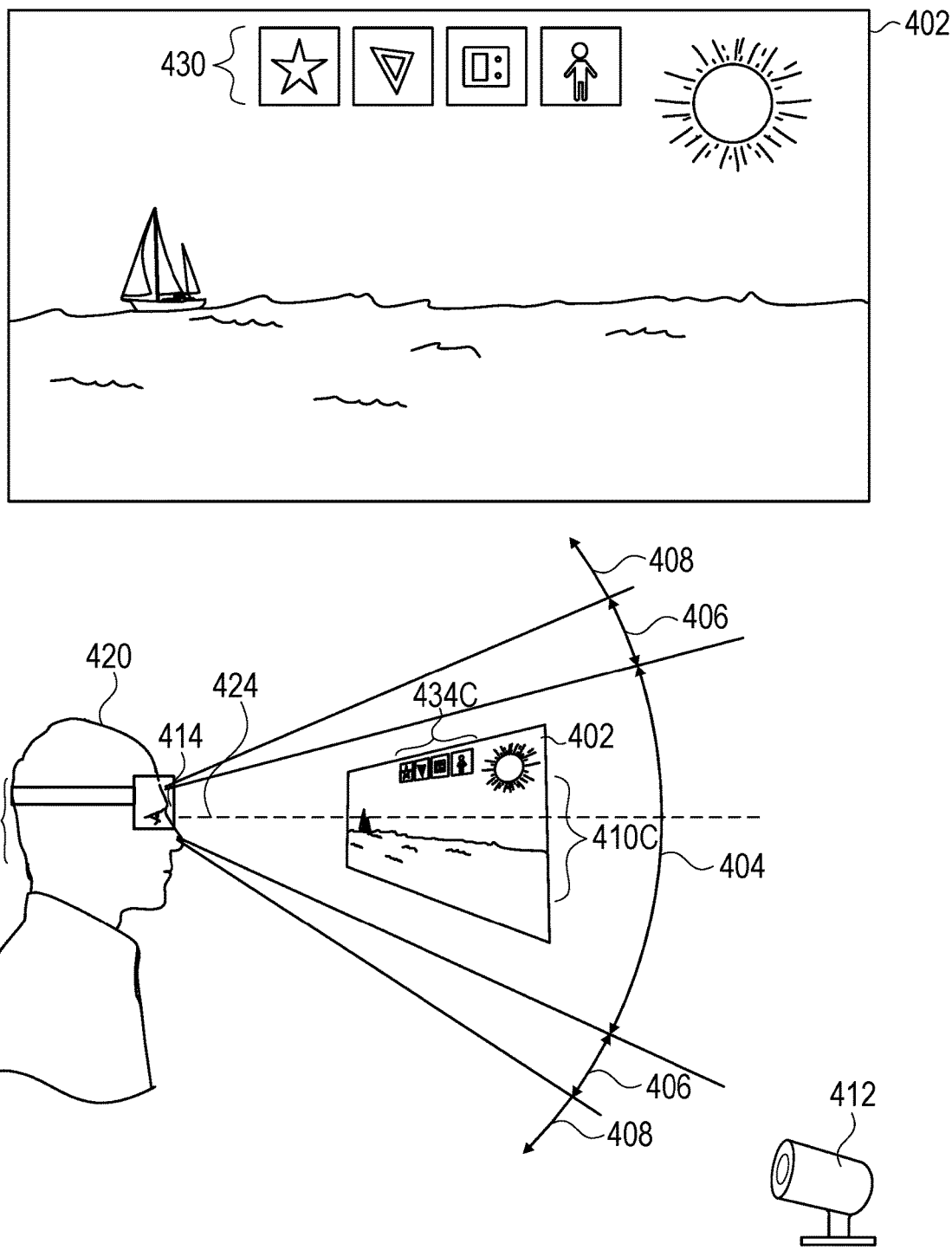

FIG. 4C illustrates repositioning user interface objects 430 when HMD 414 detects that the user's head position 400B is outside the range of ergonomic head positions 404. In some embodiments, user interface objects 430 are moved to position 434C within user interface 402, which is already positioned in a position 410C that corresponds to an ergonomic head position 400C within the ergonomic range of head positions 404. In some embodiments, both user interface objects 430 and user interface 402 are moved from an un-ergonomic position to a position 410C that corresponds to a head position within the ergonomic range of head positions 404. Note that the view in user interface 402 has not changed from FIG. 4B to 4C, despite detecting the change in head position from head position 400B to head position 400C. As a result, user 420 can continue to view the desired content without needing to maintain a head position that is not in the ergonomic range 404. In some embodiments, only user interface objects 430 are moved from position 434B to position 434C without moving the position of user interface 402 in the CGR environment from position 410B to 410C.

Figure 4D:
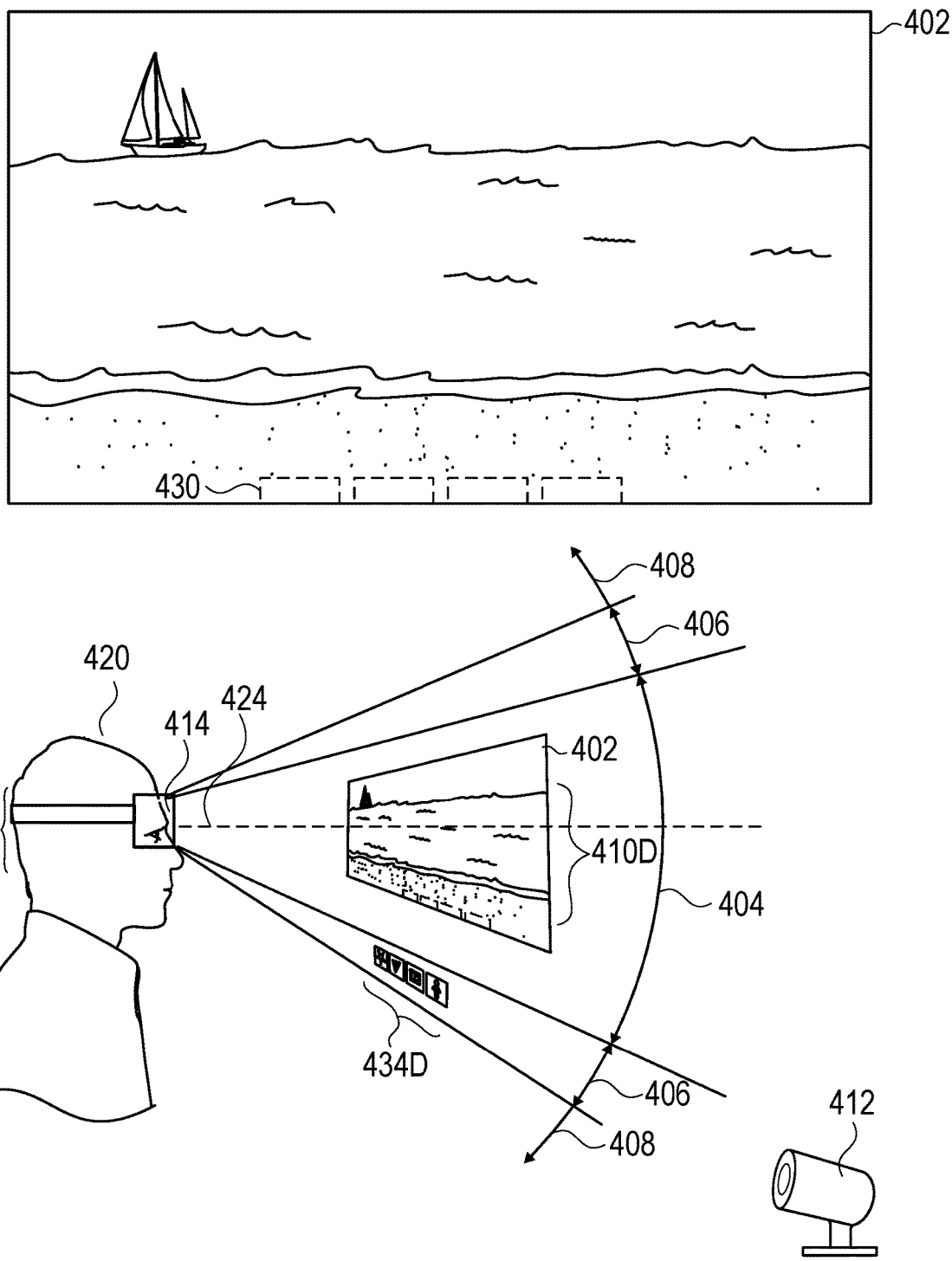

Similarly, FIG. 4D illustrates displaying user interface objects 430 positioned along the bottom edge of user interface 402 at position 434D, while user interfaced 402 is positioned at position 410D, which corresponds to an ergonomic head position 400D. In some embodiments, when user interface objects 430 (e.g., icons) are positioned in the CGR environment at a position that is not visible from the current head position 400A, an indication (e.g., outline, partial outline, dotted representation) of the user interface objects is displayed (e.g., at a position that is visible from the current head position 400A) instead of the actual user interface objects. In some embodiments, a user interface object is at a position that is not visible from the current head position when at least a portion of the user interface object is not visible from the current head position (even if a portion of the user interface object is visible). In some embodiments, a user interface object is at a position that is not visible from the current head position when the entire user interface object is not visible from the current head position. In some embodiments, user interface objects 430 are positioned outside user interface 402 in the CGR environment. In some embodiments, user interface objects 430 are positioned in a position 434E that corresponds to a head position 400E within the warning range of head positions 406. In some embodiments, user interface objects 430 are positioned in a position that corresponds to a head position within the un-ergonomic range of head positions 408.

Figure 4E:
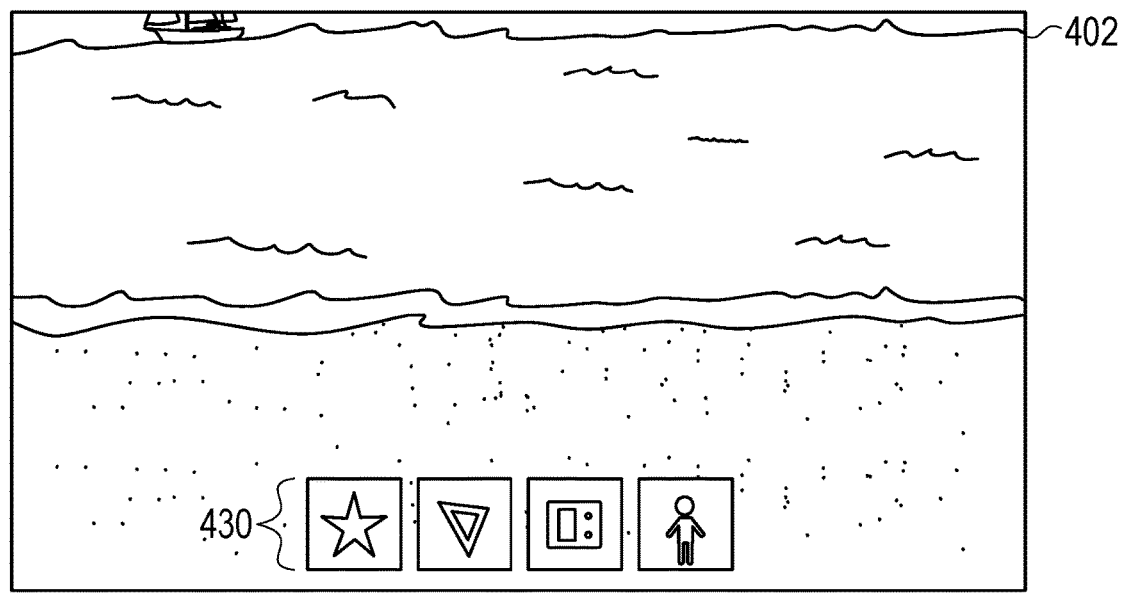
Figure 4E:
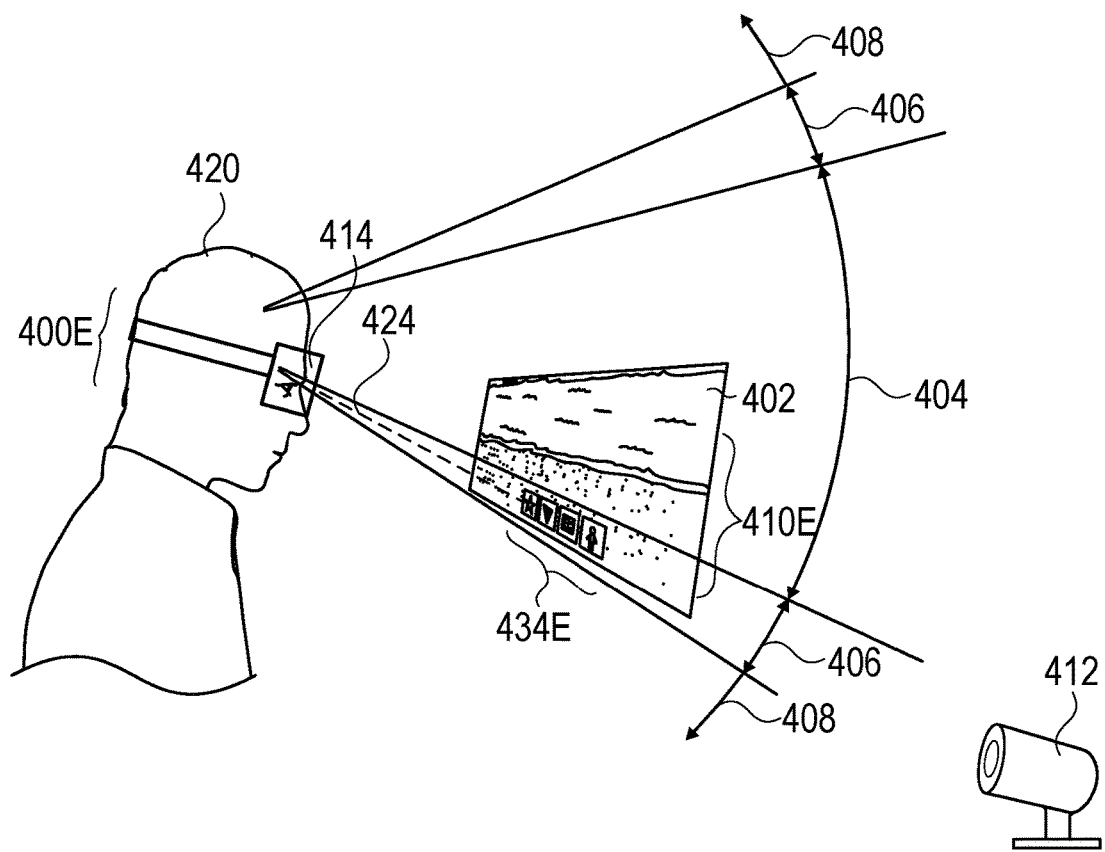

At FIG. 4E, user 420 moves her/his head down to head position 400E to bring user interface objects 430 into view (e.g., within a field of view from the line of sight 424) at position 434E. Note that the view in user interface 402 has changed from FIG. 4D to 4E based on detecting the change in head position from head position 400D to head position 400E. In some embodiments, once user interface objects 430 are fully within the field of view, the display of user interface objects 430 changes from an outline of the user interface objects to the actual depiction of the user interface objects. In some embodiments, user 420 tilts her/his head down from ergonomic head position 400D to an un-ergonomic head position 400E to view user interface objects 430 at position 434E. In some embodiments, user interface objects 430 are positioned at position 434E that cause user 420 to move her/his head to a head position 400E within the warning range of head positions 406. In some embodiments, user interface objects 430 are positioned at position that cause user 420 to move her/his head to a head position within the un-ergonomic range of head positions 408. In some embodiments, a notification is displayed when user 420 tilts her/his head to head position 400E that is outside the ergonomic range of head positions 404.

Figure 4F:
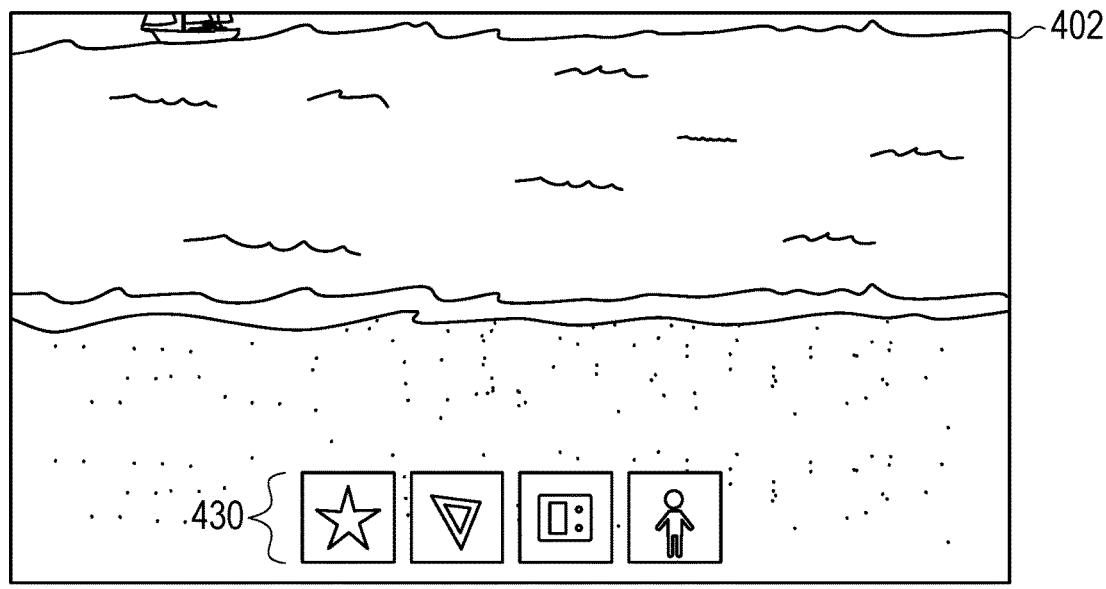
Figure 4F:
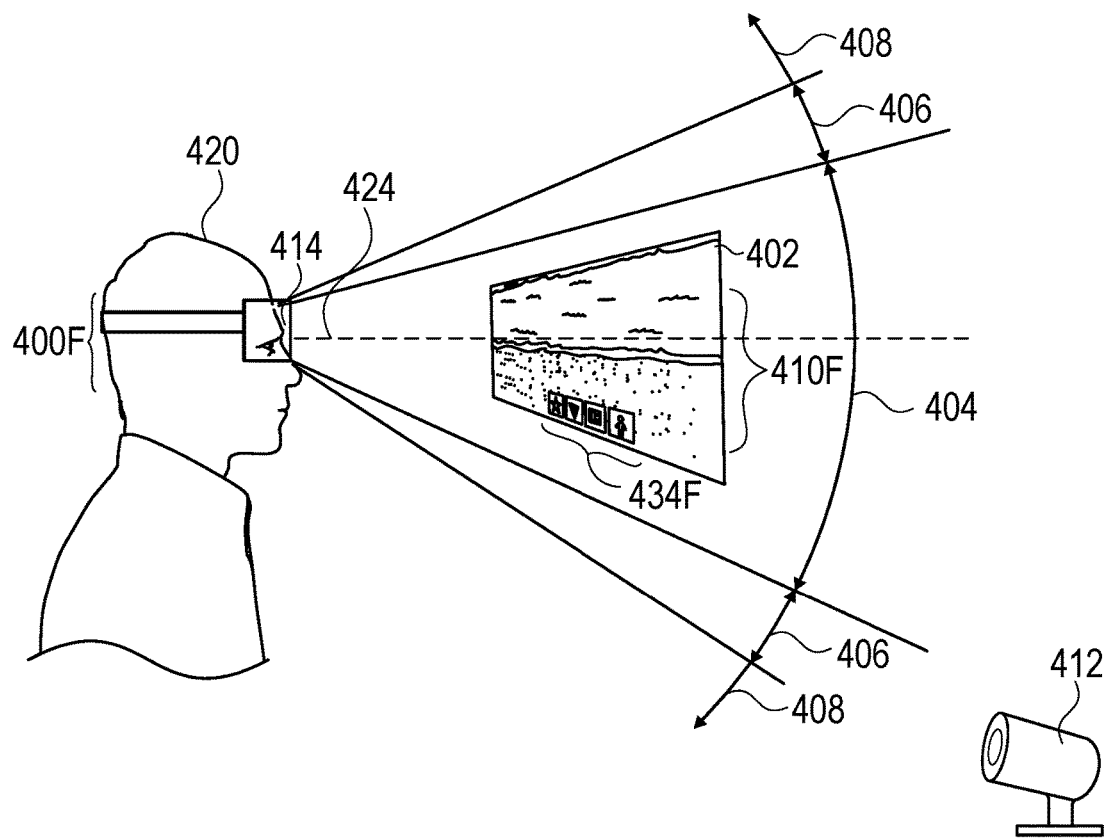

FIG. 4F illustrates repositioning user interface objects 430 to a new position 434F when HMD 414 detects that the user's head position 400E is outside the range of ergonomic head positions 404. In some embodiments, user interface objects 430 are moved to position 434F within user interface 402, which is already positioned in position 410F that corresponds to an ergonomic head position 400F within the ergonomic range of head positions 404. In some embodiments, both user interface objects 430 and user interface 402 are moved from an un-ergonomic position to a position that corresponds to a head position within the ergonomic range of head positions 404. Note that the view in user interface 402 has not changed from FIG. 4E to 4F, despite detecting the change in head position from head position 400E to head position 400F. As a result, user 420 can continue to view the desired content without needing to maintain a head position that is not in the ergonomic range 404. In some embodiments, only user interface objects 430 are moved from position 434D to position 434F without moving the position 410F of user interface 402 in the CGR environment from position 410E to 410F.

Figure 5:
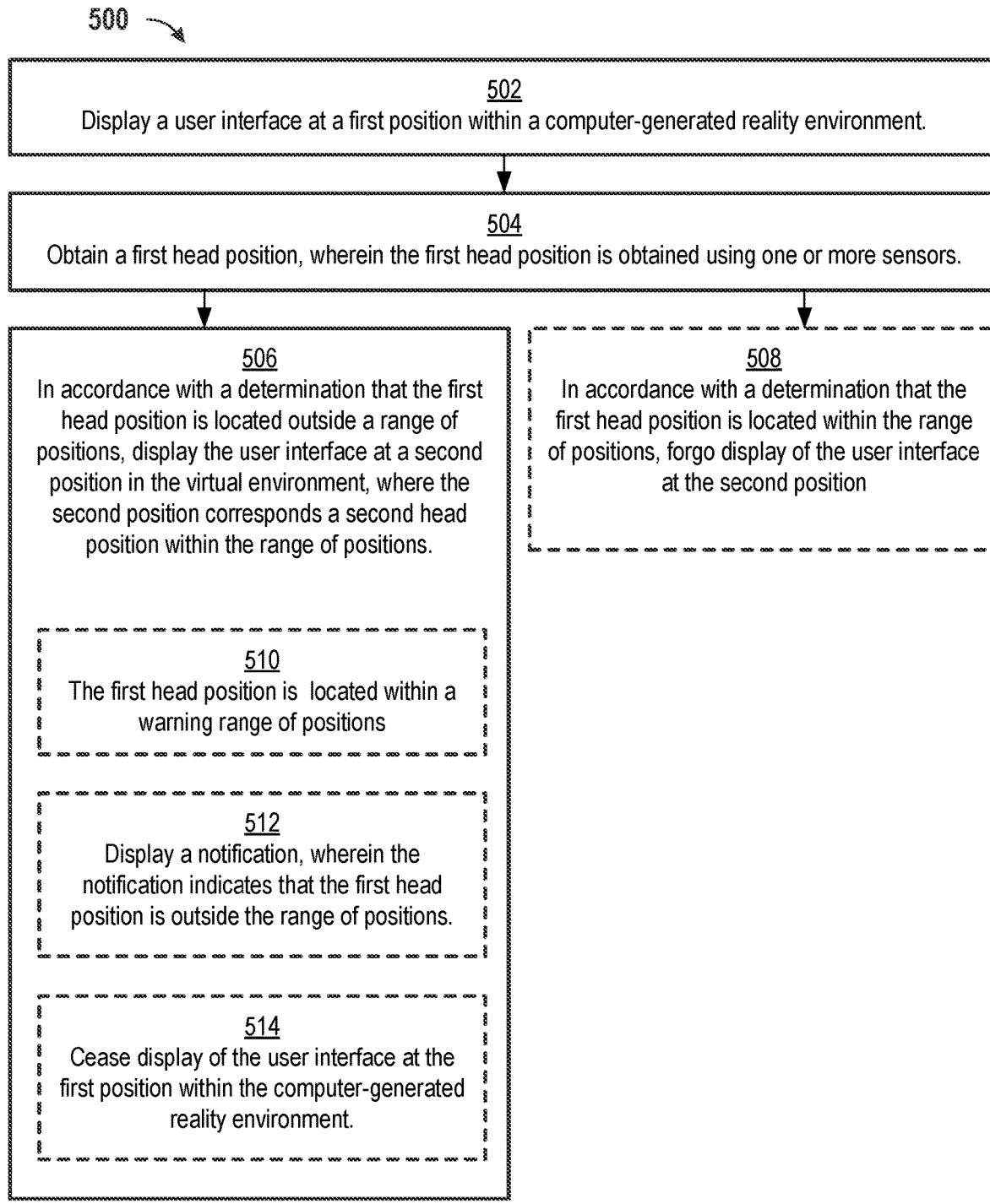
FIG. 5 depicts a method for determining when a user is viewing user interface objects in a user interface in a computer-generated reality environment at an un-ergonomic head position and repositioning the user interface objects within the user interface so that it can be viewed from a more ergonomic head position.

FIG. 5 depicts an exemplary method 500 for determining whether a user is viewing a user interface in a computer-generated reality environment at a range of head positions and determining whether to reposition the user interface so that it can be viewed from a more ergonomic head position. In some examples, the method is carried out by an exemplary user device implementing system 100, such as described above.

In the description below, method 500 is described as being performed using an exemplary user device (e.g., HMD 214, 314, 414). It should be recognized that, in other embodiments, method 500 is performed using one or more electronic devices, such as a paired exemplary user device that is communicatively coupled to an exemplary external device (e.g., camera 212, 312, 412). In some embodiments, the operations of method 500 are distributed in any manner between the user device and an external secondary device. It should be appreciated that the order for performing the blocks of FIG. 5 can be modified. Further, one or more blocks of process 500 can be optional and/or additional blocks can be performed.

At block 502, an exemplary user device (e.g., HMD 214, 314, 414) displays a user interface (e.g., user interface 202, 302, 402) at a first position (e.g., positions 210A, 210B, 210C, 210E, 310A, 410A, 410B) within a computer-generated reality environment. In some embodiments, the placing the user interface (e.g., 202, 302, 402) at the first position is based on a determination of the user's current head position. In some embodiments, displaying the user interface at the second position in the computer-generated reality environment comprises positioning the user interface in the virtual environment based on the detected first head position (e.g., head position 200A-200E, 300A-300C, 400A-400E). In some embodiments, displaying the user interface at the first position (e.g., first position 210A, 310A, 410A) allows the user to view the user interface from an ergonomic head position. In some embodiments, displaying the user interface at the first position (e.g., 210B, 210C, 210E, 410B, 410E) results in the user viewing the user interface from an un-ergonomic head position.

At block 504, the exemplary user device (e.g., HMD 214, 314, 414) obtains a first head position (e.g., head position 200A-200E, 300A-300C, 400A-400E), where the first head position is obtained using one or more sensors (e.g., sensors 212, 312, 412). In some embodiments, the one or more sensors include infrared camera sensors and visible light sensors. In some embodiments, the one or more sensors are integrated with the exemplary user device. In some embodiments, the one or more sensors are located on an external device that is different from the user device that is displaying the user interface. In some embodiments, the exemplary user device obtains a first head position based on data obtained from the exemplary user device. In some embodiments, the data includes gaze, posture, and head position. In some embodiments, exemplary user device uses an API to obtain information regarding the user's head position.

At block 506, in accordance with a determination that the first head position (e.g., head position 200B, 200C, 200E, 300B, 400B, 400E) is located outside a range of positions (e.g., ranges 204, 304, 404), the exemplary user device (e.g., HMD 214, 314, 414) displays the user interface (e.g., user interface 202, 302, 402) at a second position (e.g., position 210D, corresponding to head position 300C, 410C, 410F) in the computer-generated reality environment, where the second position corresponds to a second head position (e.g., 200D, 300C, 400C, 400F) within the range of positions (e.g., that is in an ergonomically-viewable position).

In some embodiments, the first head position is located outside the range of positions if it is outside an ergonomic range of head positions. In some embodiments, the first head position is outside the ergonomic range of head positions includes the set of head positions in which the angle between the user's line of sight at the first head position and the forward vector is greater than a threshold number of degrees. In some embodiments, the ergonomic range of positions of head positions is based on a range of head positions where the threshold number of degrees is based on the degree of change of yaw, pitch, or roll or a combination of the values from the forward vector 222. In some embodiments, the ergonomic range of head positions is based on additional factors such as the user's gaze and posture.

In some embodiments, the user interface is moved to the second position so that the user interface is viewable from an ergonomic head position. In some embodiments, the second head position permits a line of sight to the user interface displayed at the second position within a predetermined number of degrees from the forward vector. In some embodiments, the pitch, roll, and yaw of the head position is considered as factors in the determination of the second head position. In some embodiments, moving the user interface to the second position causes the user to move her/his head position to a second head position that is in the ergonomic range of head positions. In some embodiments, the displayed user interface at the second position is viewable from the second head position, but is not viewable or is only partially viewable from the first head position.

At block 508, in accordance with a determination that the first head position (e.g., head position 200A, 300A, 400A) is located within the range of positions (e.g., range 204, 304, 404), forgo displaying the user interface (e.g., user interface 202, 302, 402) at the second position (e.g., head position 200D, 300C, 400C, 400F). In some embodiments, the first head position is already in a position within the ergonomic range of head positions, so the user interface does not need to be moved to a new position to be viewable from an ergonomic position.

At block 510, the first head position (e.g., head position 200A, 300A, 400A) is located within a warning range of positions (e.g., warning range 206, 306, 406) that is outside the ergonomic range of positions (e.g., range 204, 304, 404). In some embodiments, the warning range of positions includes head positions that are slightly not ergonomic or that are a threshold number of degrees off from a head position in the ergonomic range of head positions. In some embodiments, a subset of the head positions within the warning range of positions are also in the ergonomic range of head positions. In some embodiments, the set of head positions in the warning range of head positions is a subset of the set of head positions in the ergonomic range of head positions 204. In some embodiments, the warning range of positions is mutually exclusive from the ergonomic range of positions. In some embodiments, the set of head positions within the warning range of positions is a subset of the head positions within the undesirable range of positions. In some embodiments, the head positions within the warning range of positions are mutually exclusive with the head positions in the undesirable range of positions.

At block 512, a notification (e.g., notification 330) is displayed if the first head position (e.g., head position 200A, 300A, 400A) is outside the ergonomic range of head positions (e.g., range 204, 304, 404). In some embodiments, a notification is displayed if the first head position is located outside the ergonomic range of positions for a duration longer than a predetermined time period. In some embodiments, a notification is displayed if the first head position is located outside the warning range of positions (e.g., warning range 206, 306, 406). In some embodiments, a notification is displayed if the first head position is located outside the warning range of positions for a duration longer than a predetermined time period.

At block 514, in accordance with a determination that the first head position (e.g., head position 200A, 300A, 400A) is located outside the ergonomic range of positions (e.g., range 204, 304, 404), the exemplary user device (e.g. HMD 214, 314, 414) ceases display of the user interface (e.g., user interface 202, 302, 402) at the first position within the computer-generated reality environment. In some embodiments, in accordance with a determination that the first head position is located outside the ergonomic range of positions, the computer-generated reality environment is not displayed.

As described above, one aspect of the present technology is the gathering and use of biometrics information, particularly related to head position and posture, to improve the delivery to computer-generated reality content. The present disclosure recognizes that the use of such information, in the present technology, can be used to the benefit of users, for example to improve comfort and ergonomics.

Entities responsible for the gathering and use of this type of information should comply with well-established privacy policies and/or privacy practices. In particular, such entities should implement and consistently use privacy policies and practices that are generally recognized as meeting or exceeding industry or governmental requirements for maintaining personal information data private and secure. For example, the present technology may be implemented in a way that avoids transmission of head position data outside device 100. Alternative or in addition, users may be permitted to opt-in and/or opt-out of the use of the present technology. Systems implementing the above-described features can also inform users that device sensors are detecting head movement for proposes of object placement in a computer-generated reality.

Therefore, although the present disclosure broadly covers use of biometrics such as head position information to implement one or more various disclosed embodiments, the present disclosure also contemplates that the various embodiments can also be implemented without the need for transmitting such information beyond the user's device and/or in other ways that better comport with established privacy policies and/or practices.

The foregoing descriptions of specific embodiments, as described with reference to FIGS. 1A-5, have been presented for purposes of illustration and description. They are not intended to be exhaustive or to limit the scope of the claims to the precise forms disclosed, and it should be understood that many modifications and variations are possible in light of the above descriptions.

What is claimed is:

1. An electronic device, comprising:
one or more processors; and memory storing one or more programs configured to be executed by the one or more processors, the one or more programs including instructions for:
displaying a user interface at a first position in a computer-generated reality environment, wherein the user interface includes a virtual object;
detecting a first head position, wherein the first head position is detected using one or more sensors;
in accordance with a determination that the first head position is located outside a range of positions, repositioning the user interface with the virtual object to a second position in the computer-generated reality environment, wherein the second position corresponds to a second head position within the range of positions; and
in accordance with a determination that the first head position is located within the range of positions, forgoing display of the user interface at the second position.

2. The electronic device of claim 1, wherein displaying the user interface at the second position in the computer-generated reality environment comprises positioning the user interface in the computer-generated reality environment based on the detected first head position.

3. The electronic device of claim 1, wherein the displayed user interface at the second position is viewable from the second head position, but is not viewable or is only partially viewable from the first head position.

4. The electronic device of claim 1, wherein the second head position permits a line of sight to the user interface displayed at the second position within a predetermined number of degrees from a forward vector.

5. The electronic device of claim 1, the one or more programs further including instructions for:
in accordance with a determination that the first head position is located outside the range of positions, receiving an indication through an application programming interface that the user interface should be moved to the second position.

6. The electronic device of claim 1, the one or more programs further including instructions for:
determining whether the first head position is located outside the range of positions, wherein gaze or posture is a factor in determining whether the first head position is located outside the range of positions.

7. The electronic device of claim 1, wherein the one or more sensors are located on an external device that is different from the electronic device that is displaying the user interface.

8. The electronic device of claim 1, wherein the displayed user interface at the first position in the computer-generated reality environment corresponds to a first application, the one or more programs further including instructions for:
while displaying the user interface of the first application in the first position, receiving a notification from a second application different from the first application;
displaying the notification at a third position in the computer-generated reality environment;
in response to receiving the notification, detecting a third head position, wherein the third head position is detected using one or more sensors and the third head position is different from the first head position; and
in accordance with a determination that the third head position is located outside the range of positions:
displaying the notification at a fourth position in the computer-generated reality environment, wherein the fourth position corresponds to a fourth head position within the range of positions.

9. The electronic device of claim 1, the one or more programs further including instructions for:
displaying a row of icons at a third position on the user interface while the user interface is at the first position, wherein the third position corresponds to a third head position outside the range of positions; and
in accordance with a determination that the third head position is located outside the range of positions, displaying the row of icons at a fourth position in the user interface, wherein the fourth position is different from the third position in the user interface and the fourth position corresponds to a fourth head position within the range of positions.

10. A non-transitory computer-readable medium, comprising one or more programs configured to be executed by one or more processors of an electronic device, the one or more programs including instructions for:
displaying a user interface at a first position in a computer-generated reality environment wherein the user interface includes a virtual object;
detecting a first head position, wherein the first head position is detected using one or more sensors;
in accordance with a determination that the first head position is located outside a range of positions, repositioning the user interface with the virtual object to a second position in the computer-generated reality environment, wherein the second position corresponds to a second head position within the range of positions; and
in accordance with a determination that the first head position is located within the range of positions, forgoing display of the user interface at the second position.

11. The non-transitory computer-readable medium of claim 10, wherein displaying the user interface at the second position in the computer-generated reality environment comprises positioning the user interface in the computer-generated reality environment based on the detected first head position.

12. The non-transitory computer-readable medium of claim 10, wherein the displayed user interface at the second position is viewable from the second head position, but is not viewable or is only partially viewable from the first head position.

13. The non-transitory computer-readable medium of claim 10, wherein the second head position permits a line of sight to the user interface displayed at the second position within a predetermined number of degrees from a forward vector.

14. The non-transitory computer-readable medium of claim 10, the one or more programs further including instructions for:
in accordance with a determination that the first head position is located outside the range of positions, receiving an indication through an application programming interface that the user interface should be moved to the second position.

15. The non-transitory computer-readable medium of claim 10, the one or more programs further including instructions for:
    determining whether the first head position is located outside the range of positions, wherein gaze or posture is a factor in determining whether the first head position is located outside the range of positions.

16. The non-transitory computer-readable medium of claim 10, wherein the one or more sensors are located on an external device that is different from the electronic device that is displaying the user interface.

17. The non-transitory computer-readable medium of claim 10, wherein the displayed user interface at the first position in the computer-generated reality environment corresponds to a first application, the one or more programs further including instructions for:
    while displaying the user interface of the first application in the first position, receiving a notification from a second application different from the first application;
    displaying the notification at a third position in the computer-generated reality environment;
    in response to receiving the notification, detecting a third head position, wherein the third head position is detected using one or more sensors and the third head position is different from the first head position; and
    in accordance with a determination that the third head position is located outside the range of positions:
        displaying the notification at a fourth position in the computer-generated reality environment, wherein the fourth position corresponds to a fourth head position within the range of positions.

18. The non-transitory computer-readable medium of claim 10, the one or more programs further including instructions for:
    displaying a row of icons at a third position on the user interface while the user interface is at the first position, wherein the third position corresponds to a third head position outside the range of positions; and
    in accordance with a determination that the third head position is located outside the range of positions, displaying the row of icons at a fourth position in the user interface, wherein the fourth position is different from the third position in the user interface and the fourth position corresponds to a fourth head position within the range of positions.

19. A method, comprising:
    displaying a user interface at a first position in a computer-generated reality environment wherein the user interface includes a virtual object;
    detecting a first head position, wherein the first head position is detected using one or more sensors;
    in accordance with a determination that the first head position is located outside a range of positions, repositioning the user interface with the virtual object to a second position in the computer-generated reality environment, wherein the second position corresponds to a second head position within the range of positions; and
    in accordance with a determination that the first head position is located within the range of positions, forgoing display of the user interface at the second position.

20. The method of claim 19, wherein displaying the user interface at the second position in the computer-generated reality environment comprises positioning the user interface in the computer-generated reality environment based on the detected first head position.

21. The method of claim 19, wherein the displayed user interface at the second position is viewable from the second head position, but is not viewable or is only partially viewable from the first head position.

22. The method of claim 19, wherein the second head position permits a line of sight to the user interface displayed at the second position within a predetermined number of degrees from a forward vector.

23. The method of claim 19, further comprising:
    in accordance with a determination that the first head position is located outside the range of positions, receiving an indication through an application programming interface that the user interface should be moved to the second position.

24. The method of claim 19, further comprising:
    determining whether the first head position is located outside the range of positions, wherein gaze or posture is a factor in determining whether the first head position is located outside the range of positions.

25. The method of claim 19, wherein the one or more sensors are located on an external device that is different from the electronic device that is displaying the user interface.

26. The method of claim 19, wherein the displayed user interface at the first position in the computer-generated reality environment corresponds to a first application and the method further comprising:
    while displaying the user interface of the first application in the first position, receiving a notification from a second application different from the first application;
    displaying the notification at a third position in the computer-generated reality environment;
    in response to receiving the notification, detecting a third head position, wherein the third head position is detected using one or more sensors and the third head position is different from the first head position; and
    in accordance with a determination that the third head position is located outside the range of positions:
        displaying the notification at a fourth position in the computer-generated reality environment, wherein the fourth position corresponds to a fourth head position within the range of positions.

27. The method of claim 19 further comprising:
    displaying a row of icons at a third position on the user interface while the user interface is at the first position, wherein the third position corresponds to a third head position outside the range of positions; and
    in accordance with a determination that the third head position is located outside the range of positions, displaying the row of icons at a fourth position in the user interface, wherein the fourth position is different from the third position in the user interface and the fourth position corresponds to a fourth head position within the range of positions.

* * * * *